(12) United States Patent
Kawarai et al.

(10) Patent No.: US 11,747,264 B2
(45) Date of Patent: Sep. 5, 2023

(54) CORROSION DETECTION SENSOR, ELECTRICAL APPARATUS INCLUDING THE SAME, AND METHOD OF DETECTING CORROSION

(71) Applicant: Mitsubishi Electric Corporation, Tokyo (JP)

(72) Inventors: Hisakatsu Kawarai, Tokyo (JP); Raizo Maeda, Tokyo (JP); Tetsuo Tanaka, Tokyo (JP); Osamu Mizuno, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 45 days.

(21) Appl. No.: 17/611,194

(22) PCT Filed: Aug. 23, 2019

(86) PCT No.: PCT/JP2019/033119
§ 371 (c)(1),
(2) Date: Nov. 15, 2021

(87) PCT Pub. No.: WO2020/255427
PCT Pub. Date: Dec. 24, 2020

(65) Prior Publication Data
US 2022/0307969 A1    Sep. 29, 2022

(30) Foreign Application Priority Data

Jun. 18, 2019 (JP) .................................. 2019-112493
Jul. 25, 2019 (JP) .................................. 2019-137005

(51) Int. Cl.
*G01N 17/02* (2006.01)
*G01N 27/12* (2006.01)
*G01N 27/20* (2006.01)

(52) U.S. Cl.
CPC ............. *G01N 17/02* (2013.01); *G01N 27/12* (2013.01); *G01N 27/20* (2013.01)

(58) Field of Classification Search
CPC ........ G01N 17/02; G01N 27/12; G01N 27/20; G01N 17/04
See application file for complete search history.

(56) References Cited

U.S. PATENT DOCUMENTS

2016/0356698 A1    12/2016  Chou et al.
2018/0259442 A1*    9/2018  Minamitani ........... G01N 27/20
2019/0271441 A1*    9/2019  Zhang ...................... F17D 5/06

FOREIGN PATENT DOCUMENTS

CN    108169112 A    6/2018
JP    2002-139416 A  5/2002
(Continued)

OTHER PUBLICATIONS

International Search Report and Written Opinion dated Nov. 19, 2019, received for PCT Application PCT/JP2019/033119, Filed on Aug. 23, 2019, 9 pages including English Translation.
(Continued)

*Primary Examiner* — Feba Pothen
(74) *Attorney, Agent, or Firm* — XSENSUS LLP

(57) ABSTRACT

The corrosion detection sensor detects corrosion to an electrical apparatus caused by a corrosive gas. The corrosion detection sensor includes a metal thin film to be corroded by the corrosive gas, a resistive element connected in series to the metal thin film, a resistance measuring instrument that measures a combined resistance of the metal thin film and the resistive element, and a notification unit that outputs a detection result indicating that the combined resistance measured by the resistance measuring unit is greater than a predetermined reference resistance. The reference resistance is determined according to a danger level indicating that the
(Continued)

electrical apparatus is corrosively damaged by the corrosive gas.

9 Claims, 36 Drawing Sheets

(56) References Cited

FOREIGN PATENT DOCUMENTS

| | | |
|---|---|---|
| JP | 2010-38838 A | 2/2010 |
| JP | 2014-153089 A | 8/2014 |
| JP | 2015-206723 A | 11/2015 |
| JP | 2016-138751 A | 8/2016 |
| JP | 2017-3285 A | 1/2017 |
| JP | 2017-9246 A | 1/2017 |

OTHER PUBLICATIONS

Office Action dated Jun. 20, 2022 in Indian Patent Application No. 202127055056, 7 pages.

\* cited by examiner

<FOURTH EXAMPLE OF FOURTH EMBODIMENT>

CORROSION DETECTION SENSOR, ELECTRICAL APPARATUS INCLUDING THE SAME, AND METHOD OF DETECTING CORROSION

CROSS-REFERENCE TO RELATED APPLICATIONS

The present application is based on PCT filing PCT/JP2019/033119, filed Aug. 23, 2019, which claims priority to Japanese Patent Application Nos. 2019-112493, filed on Jun. 18, 2019, and 2019-137005, filed on Jul. 25, 2019, the entire contents of each are incorporated herein by its reference.

TECHNICAL FIELD

The present disclosure relates to a corrosion detection sensor, an electrical apparatus including the same, and a corrosion detection method.

BACKGROUND ART

When an electrical apparatus is installed in an environment containing a corrosive gas, the electrical apparatus will be corroded over time, which may cause a corrosive damage to a circuit board (such as a corrosive disconnection of a metal wire) or the like. In order to prevent such a problem from occurring, there has been proposed such a technique that detects the corrosiveness of an environment (corresponding to the degree of progress of corrosion to the electrical apparatus) where the electrical apparatus is installed.

For example, Japanese Patent Laying-Open No. 2010-38838 (PTL 1) discloses a deterioration diagnosis system that accurately estimates a future amount of corrosion to a conductive member. The deterioration diagnosis system includes a diagnostic processor and an ambient environment database. The diagnostic processor records environment data of a housing where a diagnosis target is housed (including the temperature and the humidity in the housing) and corrosion data of the diagnosis target for a predetermined period of time, and estimates a future amount of corrosion to the diagnosis target based on the recorded data. The ambient environment database is stored with ambient environment data including previous temperatures and humidities outside the housing.

CITATION LIST

Patent Literature

PTL 1: Japanese Patent Laying-Open No. 2010-38838

SUMMARY OF INVENTION

Technical Problem

The deterioration diagnosis system disclosed in PTL 1 requires to install a device capable of determining whether or not a predetermined period of time (for example, one month, two months or three months) has elapsed. Further, as the ambient environment database, for example, weather statistics information database must be prepared (see paragraph [0008] of PTL 1). Thus, the system may become advanced and complex.

The present disclosure has been made in order to solve the aforementioned problems, and an object of the present disclosure is to provide a technique capable of determining the degree of progress of corrosion to an electrical apparatus caused by a corrosive gas with a simple configuration.

Solution to Problem

A corrosion detection sensor according to an aspect of the disclosure detects corrosion to an electrical apparatus caused by a corrosive gas. The corrosion detection sensor includes a metal thin film to be corroded by the corrosive gas, a resistive element connected in series to the metal thin film, a resistance measuring unit that measures a combined resistance of the metal thin film and the resistive element, and a resistance output unit that outputs a detection result indicating that the combined resistance measured by the resistance measuring unit is greater than a predetermined reference resistance. The reference resistance is determined according to a danger level indicating that the electrical apparatus is corrosively damaged by the corrosive gas.

The danger level is a ratio of an actual reduction amount of a film thickness of the metal thin film to a maximum reduction amount of the film thickness of the metal thin film. The maximum reduction amount is an reduction amount of the film thickness of the metal thin film until the electrical apparatus is corrosively damaged when the electrical apparatus and the metal thin film are exposed to an environment containing the corrosive gas.

The metal thin film includes a plurality of thin films connected in parallel. The materials of the plurality of thin films are the same. The film thicknesses of the plurality of thin films are different from each other. Each of the plurality of thin films is defined with a corresponding reference resistance. The resistance output unit outputs the detection result each time when the combined resistance measured by the resistance measuring unit becomes greater than the corresponding reference resistance.

The metal thin film includes a plurality of thin films connected in series. Each of the plurality of thin films includes a material to be corroded by the corrosive gases different from each other in type.

The metal thin film includes a first thin film, a second thin film, a third thin film, and a fourth thin film. The first thin film and the second thin film are connected in series. The third thin film and the fourth thin film are connected in series. The first thin film and the second thin film are connected in parallel to the third thin film and the fourth thin film. Each of the first thin film and the third thin film includes a material to be corroded by a first corrosive gas. Each of the second thin film and the fourth thin film includes a material to be corroded by a second corrosive gas different from the first corrosive gas. The film thickness of the first thin film and the film thickness of the third thin film are different from each other. The film thickness of the second thin film and the film thickness of the fourth thin film are different from each other. A first reference resistance is defined for the first thin film and the second thin film. A second reference resistance is defined for the third thin film and the fourth thin film. The resistance output unit outputs the detection result each time when the combined resistance measured by the resistance measuring unit becomes greater than any one of the first reference resistance and the second reference resistance.

The metal thin film includes a plurality of thin films connected in parallel. The materials of the plurality of thin films are different from each other. Each of the plurality of thin films is defined with a corresponding reference resistance. The resistance output unit outputs the detection result each time when the combined resistance measured by the resistance measuring unit becomes greater than the corresponding reference resistance.

The metal thin film includes a first thin film, a second thin film, and a third thin film. The first thin film and the second thin film are connected in series. The first thin film and the second thin film are connected in parallel to the third thin film. The first thin film and the third thin film include different materials from each other to be corroded by a first corrosive gas. The second thin film includes a material to be corroded by a second corrosive gas different from the first corrosive gas. A first reference resistance is defined for the first thin film and the second thin film. A second reference resistance is defined for the third thin film. The resistance output unit outputs the detection result each time when the combined resistance measured by the resistance measuring unit becomes greater than any one of the first reference resistance and the second reference resistance.

The corrosion detection sensor further includes an insulating substrate. The metal thin film and the resistive element are integrally disposed on the insulating substrate.

The corrosion detection sensor further includes an insulating substrate. The metal thin film is disposed on the insulating substrate. The resistive element is disposed outside the insulating substrate as a discrete component.

An electrical apparatus according to another aspect of the present disclosure includes the corrosion detection sensor and an electrical apparatus main body.

In a corrosion detection method according to still another aspect of the present disclosure, corrosion to an electrical apparatus caused by a corrosive gas is detected by a corrosion detection sensor. The corrosion detection sensor includes a metal thin film to be corroded by a corrosive gas and a resistive element connected in series to the metal thin film. The corrosion detection method includes: a step of measuring a combined resistance of the metal thin film and the resistive element; and a step of outputting a detection result indicating that the combined resistance measured in the measuring step is greater than a predetermined reference resistance. The reference resistance is determined according to a danger level indicating that the electrical apparatus is corrosively damaged by the corrosive gas.

Advantageous Effects of Invention

According to the present disclosure, it is possible to determine the degree of progress of corrosion to an electrical apparatus caused by a corrosive gas with a simple configuration.

DESCRIPTION OF EMBODIMENTS

Figure 1:
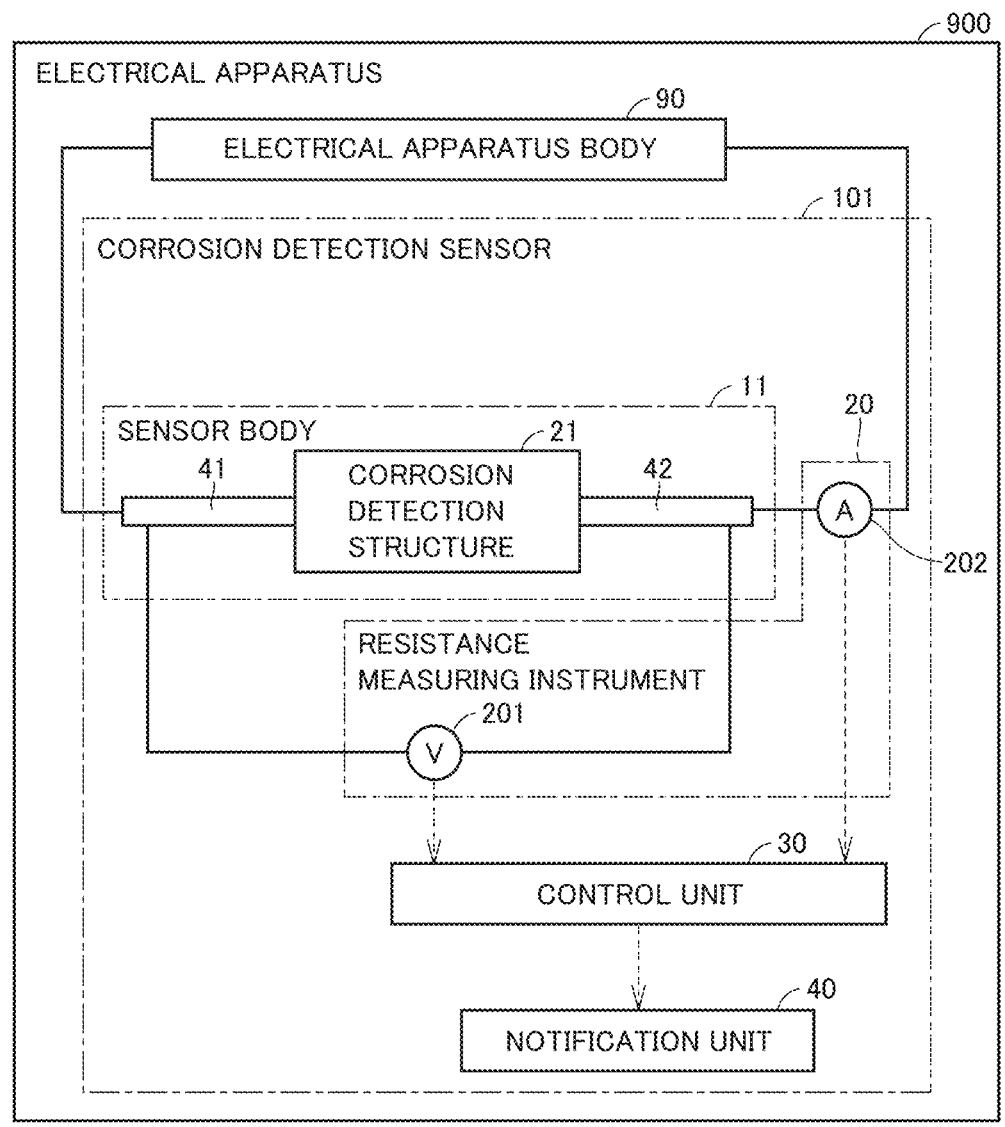
FIG. 1 is a diagram illustrating an electrical apparatus equipped with a corrosion detection sensor according to a first embodiment.

Hereinafter, embodiments will be described in detail with reference to the drawings. In the drawings, the same or corresponding portions are denoted by the same reference numerals, and the description thereof will not be repeated.

First Embodiment

FIG. 1 is a diagram illustrating an electrical apparatus equipped with a corrosion detection sensor according to a first embodiment. With reference to FIG. 1, an electrical apparatus 900 is, for example, a power converter such as an inverter or a converter, but the electrical apparatus is not limited thereto in particular. The electrical apparatus 900 is installed in a programmable logic controller (PLC), an elevator, a generator, an automobile, a railway, or the like. Under the operating environment of various applications, the electrical apparatus 900 (more specifically, an electrical apparatus main body 90 to be described later) may be corrosively damaged by a corrosive gas.

The electrical apparatus 900 includes a corrosion detection sensor 101 and an electrical apparatus main body 90. The corrosion detection sensor 101 is configured to estimate the degree of progress of corrosion to the electrical apparatus body 90. The corrosion detection sensor 101 includes a sensor body 11, a resistance measuring instrument 20, a control unit 30, and a notification unit 40.

Figure 2:
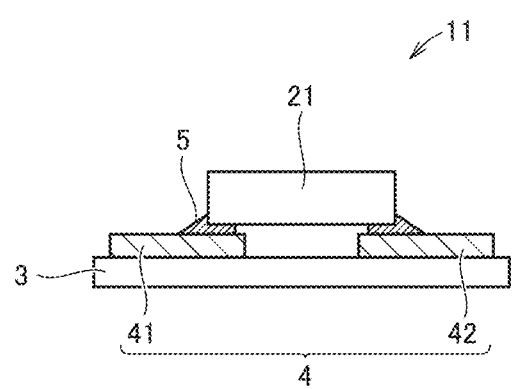
FIG. 2 is a diagram illustrating an example configuration of a sensor body according to the first embodiment.

FIG. 2 is a diagram illustrating an example configuration of the sensor body 11 according to the first embodiment. With reference to FIG. 2, the sensor body 11 includes a corrosion detection structure 21, a circuit board 3, a wire 4, and solder 5.

The circuit board 3 is, for example, a printed circuit board, and is configured to support various wires and electronic components mounted thereon.

The wire 4 includes wires 41 and 42. Each of the wires 41 and 42 is a conductive wire disposed on the circuit board 3. The wire 41 and the wire 42 are spaced from each other. The wire 41 and the wire 42 may be made of copper (Cu) or the like.

The corrosion detection structure 21 is connected between the wire 41 and the wire 42, and is mounted on the wires 41 and 42 with the solder 5 interposed therebetween. The corrosion detection structure 21 is configured to detect the degree of progress of corrosion to the corrosion detection sensor 101, and estimate the degree of progress of corrosion to the electrical apparatus main body 90 based on the degree of progress of corrosion to the corrosion detection sensor 101. The configuration of the corrosion detection structure 21 will be described later.

Referring back to FIG. 1, the resistance measuring instrument 20 measures a resistance of the sensor body 11, and outputs the measurement result to the control unit 30. In the example illustrated in FIG. 1, the electrical apparatus body 90 applies a predetermined voltage between both ends of the sensor body 11 (i.e., between the wire 41 and the wire 42). The resistance measuring instrument 20 includes, for example, a voltmeter 201 and an ammeter 202. The voltmeter 201 measures a voltage applied between both ends of the sensor body 11, and outputs the measurement result to the control unit 30. The ammeter 202 measures an electrical current flowing through the sensor body 11, and outputs the measurement result to the control unit 30. Although not shown, the voltage may be applied between both ends of the sensor body 11 by a power source (such as a compact battery) independent of the electrical apparatus main body 90. The resistance measuring instrument 20 corresponds to the "resistance measuring unit" according to the present disclosure.

The control unit 30 includes, for example, a microprocessor, and controls the notification unit 40 based on the measurement result of the resistance of the sensor body 11 measured by the resistance measuring instrument 20, More specifically, when the resistance measured by the resistance measuring instrument 20 becomes greater than a predetermined reference resistance REF, the control unit 30 controls the notification unit 40 to notify the user of the result. The reference resistance REF is determined in advance based on the danger level of the corrosive damage to the electrical apparatus main body 90 caused by a corrosive gas. The method of setting the reference resistance REF and the danger level will be described in detail later.

The control unit 30 is not an essential component of the corrosion detection sensor 101. When the electrical apparatus main body 90 is provided with a control unit, a series of steps (to be described in detail later) may be executed by the control unit. Instead of the control unit 30, the corrosion detection sensor 101 may include a circuit (such as a comparator circuit) to compare the resistance measured by the resistance measuring instrument 20 with the reference resistance REF.

The notification unit 40 includes a liquid crystal display, an LED (Light Emitting Diode) indicator, and the like, and notifies the user that the resistance measured by the resistance measuring instrument 20 is greater than the reference resistance REF.

The notification unit 40 is an example of the "resistance output unit" according to the present disclosure. The "resistance output unit" according to the present disclosure is not limited to outputting a measurement result of the resistance measured by the resistance measuring instrument 20 (or a detection result indicating that the measured resistance is greater than the reference resistance REF) to a user, and may be configured to output the measurement result to an electronic device. For example, when the control unit 30 is a comparator circuit or the like, the "resistance output unit" according to the present disclosure may output the comparison result between the resistance measured by the resistance measuring instrument 20 and the reference resistance REF as a voltage signal level (i.e., as a H (high) level or a L (low) level).

Figure 3:
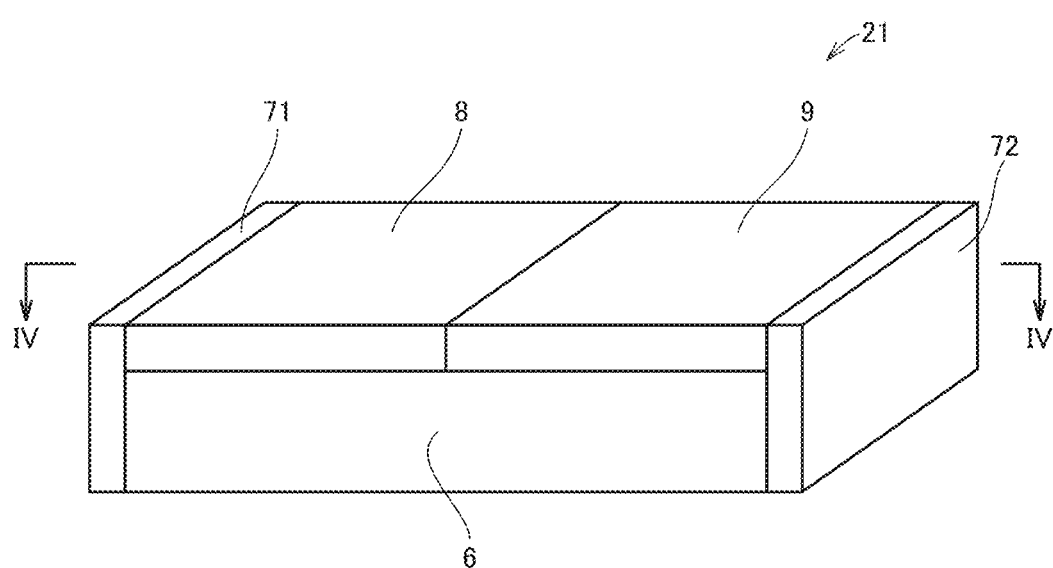
FIG. 3 is a perspective view illustrating an example configuration of a corrosion detection structure.
Figure 4:
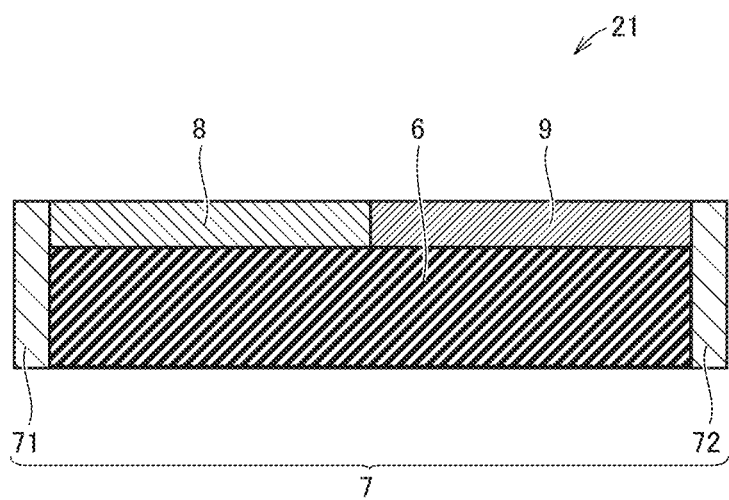
FIG. 4 is a cross-sectional view of the corrosion detection structure taken along line IV-IV of FIG. 3.

FIG. 3 is a perspective view illustrating an example configuration of the corrosion detection structure 21. FIG. 4 is a cross-sectional view of the corrosion detection structure 21 taken along line IV-IV in FIG. 3. With reference to FIGS.

3 and 4, the corrosion detection structure 21 includes an insulating substrate 6, an electrode pair 7, a metal thin film 8, and a resistor 9.

The insulating substrate 6 is, for example, an insulating substrate having a cuboid shape. The insulating substrate 6 may be made of, for example, aluminum oxide ($Al_2O_3$) or glass ($SiO_2$ or the like).

The electrode pair 7 includes a pair of electrodes, that is, a first electrode 71 and a second electrode 72. The first electrode 71 and the second electrode 72 are disposed on opposite side surfaces of the cuboid body of the insulating substrate 6. Each of the first electrode 71 and the second electrode 72 is a conductive thin film, and may be formed by, for example, tin (Sn) plating. In the example illustrated in FIGS. 3 and 4, the first electrode 71 is electrically connected to the metal thin film 8, and the second electrode 72 is electrically connected to the resistor 9.

The metal thin film 8 is a thin film made of metal and disposed on the insulating substrate 6. The width and the length of the metal thin film 8 are significantly larger than the thickness (film thickness) of the metal thin film 8. For example, the film thickness of the metal thin film 8 is 3 μm to 12 μm, the width of the metal thin film 8 is 0.8 mm, and the length of the metal thin film 8 is 1.6 mm.

The metal thin film 8 is corroded by the corrosive gas. The metal thin film 8 may be made of silver (Ag) or copper. These materials are typical metals used in an electrical apparatus, and are sensitive to major corrosive gases, whereby are suitable as materials for quantitatively evaluating the corrosiveness of an environment where the electrical apparatus 900 is installed.

In the present disclosure, the corrosive gas is a collective term of sulfur-based gas, chlorine-based gas, and nitrogen oxide. The sulfur-based gas includes hydrogen sulfide ($H_2S$), sulfur dioxide ($SO_2$), sublimed sulfur ($S_8$), and the like. The chlorine-based gas includes chlorine gas ($Cl_2$). The nitrogen oxide ($NO_x$) includes, for example, nitrogen dioxide ($NO_2$). When the material of the metal thin film 8 is silver, it is sensitive to sublimed sulfur and chlorine gas. On the other hand, copper is sensitive to hydrogen sulfide, sulfur dioxide and nitrogen dioxide.

The resistor 9 is disposed on the insulating substrate 6 and connected in series to the metal thin film 8. The resistor 9 is resistant to the corrosive gas. The resistor 9 may be made of a semiconductor oxide (for example, ruthenium oxide ($RuO_2$)). Alternatively, the resistor 9 may be made of a particular metal such as tin. The resistance value of the resistor 9 is preferably set higher than the resistance value of the metal thin film 8. The resistor 9 corresponds to the "resistive element" according to the present disclosure.

Although in FIGS. 3 and 4, it is illustrated that the film thickness of the metal thin film 8 is equal to the film thickness of the resistor 9, it is merely a schematic illustration and is not an essential condition. The configuration illustrated in FIGS. 3 and 4 is merely an example configuration of the corrosion detection structure, and the other configurations such as those illustrated in FIGS. 5 to 8 may be employed.

Figure 5:
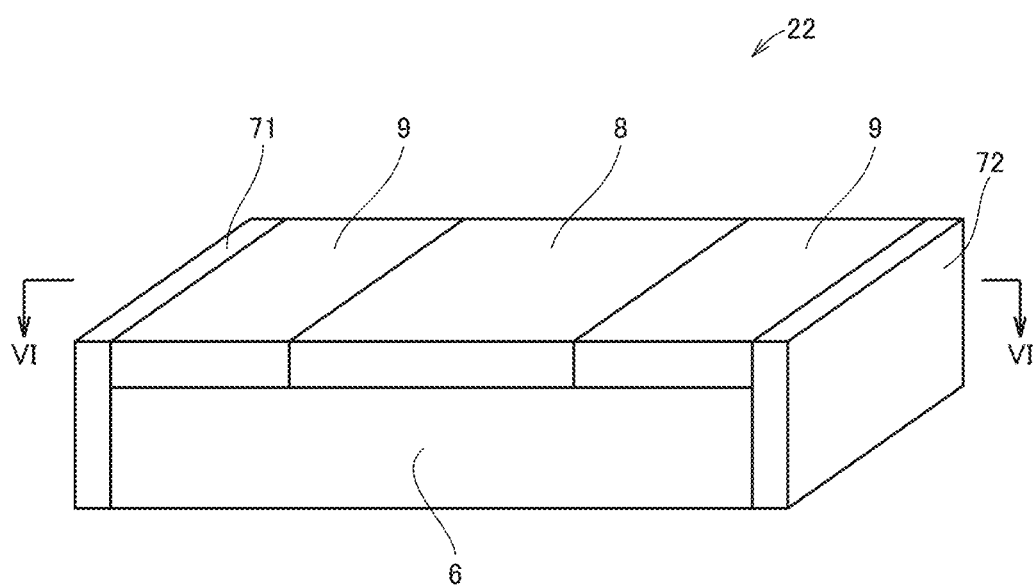
FIG. 5 is a perspective view illustrating another example configuration of a corrosion detection structure.
Figure 6:
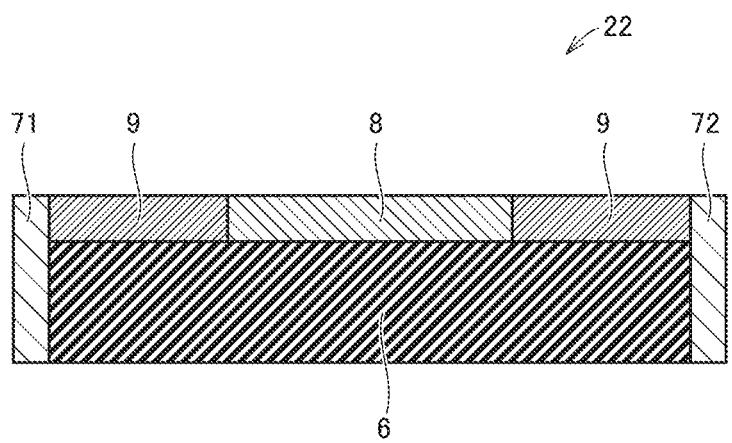
FIG. 6 is a cross-sectional view of the corrosion detection structure taken along line VI-VI of FIG. 5.

FIG. 5 is a perspective view illustrating another example configuration of a corrosion detection structure. FIG. 6 is a cross-sectional view of a corrosion detection structure 22 taken along line VI-VI in FIG. 5. With reference to FIGS. 5 and 6, in the corrosion detection structure 22, the resistor 9, the metal thin film 8, and the resistor 9 are connected in series in this order between the first electrode 71 and the second electrode 72.

Figure 7:
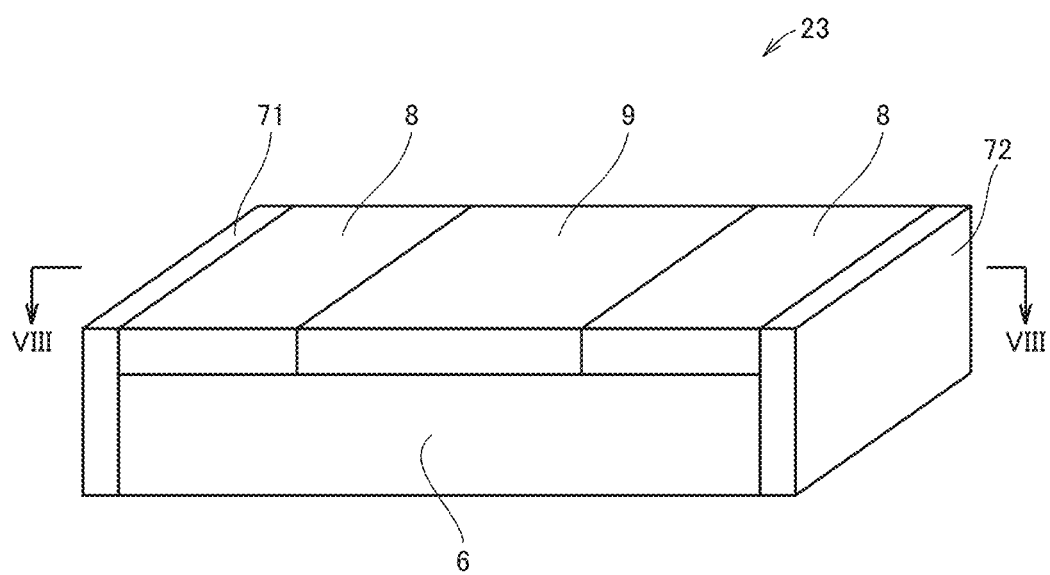
FIG. 7 is a perspective view illustrating still another example configuration of a corrosion detection structure.
Figure 8:
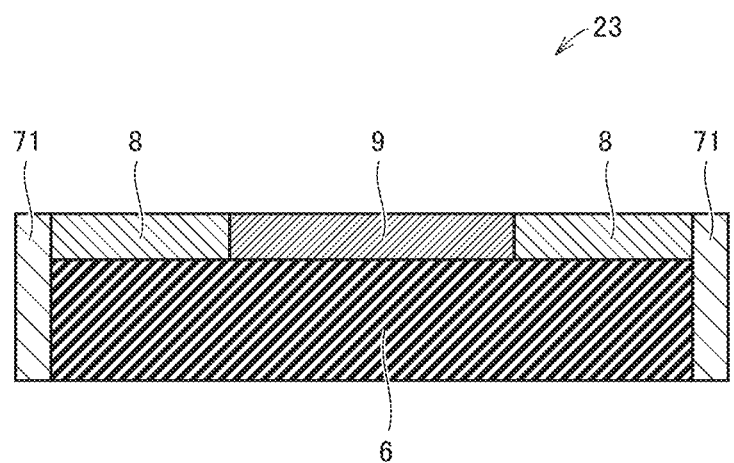
FIG. 8 is a cross-sectional view of the corrosion detection structure taken along line VIII-VIII of FIG. 7.

FIG. 7 is a perspective view illustrating still another example configuration of a corrosion detection structure. FIG. 8 is a cross-sectional view of a corrosion detection structure 23 taken along line VIII-VIII in FIG. 7. With reference to FIGS. 7 and 8, in the corrosion detection structure 23, the metal thin film 8, the resistor 9, and the metal thin film 8 are connected in series in this order between the first electrode 71 and the second electrode 72.

As can be understood from FIGS. 3 to 8, the number of the metal thin films 8 and the number of the resistive elements 9 provided in the corrosion detection structure may be one or more. Further, the connection order of the metal thin film 8 and the resistor 9 is not particularly limited. Hereinafter, the description will be carried out by using the corrosion detection structure 21 (see FIGS. 3 and 4) as a representative example, and it should be noted that the corrosion detection structure 21 may be appropriately replaced with the corrosion detection structure 22 or the corrosion detection structure 23.

In the present embodiment, the "danger level" is used as a parameter for adjusting a timing to notify the user. A method of setting the danger level will be described hereinafter.

First, the electrical apparatus 900 equipped with the corrosion detection sensor 101 is exposed to an environment containing the corrosive gas so as to determine in advance an reduction amount of the film thickness of the metal thin film 8 until the electrical apparatus main body 90 is corrosively damaged. The reduction amount thus determined is referred to as the "maximum reduction amount". More specifically, the initial film thickness of the metal thin film 8 is set to be sufficiently large (such as 20 μm). Then, the film thickness of the metal thin film 8 at a time when the electrical apparatus main body 90 is corrosively damaged (or at a time immediately before the time when the electrical apparatus main body 90 is corrosively damaged) is measured. If the film thickness is 8 μm when the electrical apparatus main body 90 is corrosively damaged, the maximum reduction amount is calculated as 12 μm (=20 μm−8 μm). The ratio of the reduction amount of the film thickness of the metal thin film 8 caused by the corrosive gas under actual operating conditions to the maximum reduction amount is defined as the "danger level" (see the following expression (1)).

The danger level=the actual reduction amount of the film thickness of the metal thin film 8/the maximum reduction amount×100%

Assume that the maximum reduction amount is 12 μm when the metal thin film 8 in the electrical apparatus 900 is made of silver. If the danger level is set to 25%, the metal thin film 8 is formed to have a film thickness of 3 μm (=12 μm×25%). Thus, when the metal thin film 8 is corroded by 3 μm under the actual operating conditions of the electrical apparatus 900, the first electrode 71 and the second electrode 72 are disconnected from each other, and therefore, the resistance measured by the resistance measuring instrument 20 increases. By detecting the increase in resistance, it is known that the corrosion to the metal thin film 8 has progressed by 3 μm.

Figure 9:
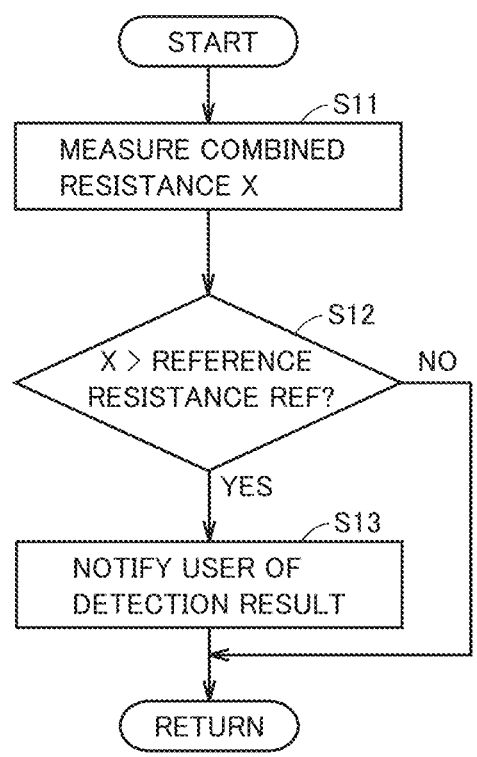
FIG. 9 is a flowchart illustrating a corrosion detection procedure according to the first embodiment.

FIG. 9 is a flowchart illustrating a corrosion detection procedure according to the first embodiment. The procedure illustrated in the flowchart of FIG. 9 and FIGS. 11 and 14 to be described later is called from a main routine (not shown) and executed by the control unit 30 every time when a predetermined period has elapsed. Generally, each step (hereinafter it will be abbreviated as "S") is implemented by the control unit 30 via software processing, and it may be implemented by an electronic circuit provided in the control unit 30 via hardware processing.

With reference to FIG. 9, in S11, the control unit 30 controls the resistance measuring instrument 20 to measure a resistance between both ends of the sensor body 11. The resistance measured by the resistance measuring instrument 20 is a combined resistance of the resistance of the insulating substrate 6, the resistance of the metal thin film 8, the resistance of the resistor 9, and the resistance of the electrode pair 7, and will be referred to as the "combined resistance X" hereinafter.

In S12, the control unit 30 compares the combined resistance X measured in S11 with the reference resistance REF. The reference resistance REF may be set to a value which is slightly greater than the combined resistance X before corroded by the corrosive gas by a small amount (for example, by an amount equal to several percent of the combined resistance X before corrosion).

If the combined resistance X is equal to or smaller than the reference resistance REF (NO in S12), the control unit 30 skips the subsequent step in S13 and returns the procedure to the main routine. Then, a series of steps illustrated in FIG. 9 are executed again after the predetermined period has elapsed. On the other hand, if the combined resistance X is greater than the reference resistance REF (YES in S12), the control unit 30 proceeds the procedure to S13.

In S13, the control unit 30 controls the notification unit 40 to notify that the danger level has reached a predetermined value (for example 25% as described above). When the notification unit 40 is an LED indicator, the notification unit 40 does not operate until the danger level reaches 25%, and when the danger level reaches 25%, the notification unit 40 notifies the user by emitting red light indicating that the danger level has reached 25%.

The notification mode of the danger level to the user is not limited. For example, when the notification unit 40 is a liquid crystal display, it may display a numerical value indicating the danger level (such as a numerical value of 25%). Alternatively, when the notification unit 40 is a buzzer, a speaker or the like, it may notify an increase of the danger level by sound.

First Example of First Embodiment

Next, the effectiveness of the corrosion detection sensor according to the present disclosure is verified. In each example to be described below, the electrical apparatus 900 (an inverter in the present example) is exposed to an environment where the corrosion to the metal thin film 8 is accelerated. More specifically, in the first example of the first embodiment, an exposure test was performed on the electrical apparatus 900 in an environment having a temperature of 75° C. and containing sublimed sulfur. As the metal thin film 8, the silver thin film having a film thickness of 3 μm as described above was used. The combined resistance X before the start of the exposure test (hereinafter also referred to as "initial combined resistance X0") was 1000 kΩ Thus, the reference resistance REF may be set to 1010 kΩ which is 1% greater than the initial combined resistance X0. After 10 days from the start of the exposure test, the corrosion to the metal thin film 8 caused by the corrosive gas progressed, whereby the combined resistance X became greater than 1010 kΩ. When the sensor body 11 was observed at this time, it was confirmed that the metal thin film 8 (the silver thin film having a film thickness of 3 μm) was corrosively disconnected.

Second Example of First Embodiment

In the second example of the first embodiment, a copper thin film having a film thickness of 3 μm was used as the metal thin film 8 provided in the corrosion detection structure 21. The maximum reduction amount of the copper thin film was 12 μm. The initial combined resistance X0 of the sensor body 11 was 1000 kΩ. The electrical apparatus 900 equipped with the corrosion detection sensor 101 was exposed to an environment of 40° C./95% RH/(3 ppm $H_2S$+10 ppm $NO_2$). Thus, the combined resistance X became greater than 1010 kΩ after 1.2 days from the start of the exposure test. When the sensor body 11 was observed at this time, it was confirmed that the metal thin film 8 (the copper thin film having a film thickness of 3 μm) provided in the corrosion detection structure 21 was corrosively disconnected.

As described above, in the first embodiment, it is not necessary to store the measurement result of the combined resistance X in memory, and it is not necessary to compare the measurement result of the combined resistance X with the previous data stored in database. According to the first embodiment, by using the corrosion detection structure 21, it is possible to determine the degree of progress of corrosion to the electrical apparatus 900 caused by the corrosive gas with a very simple configuration. By setting the danger level to a desired value of less than 100%, it is possible to notify the user of the degree of progress of corrosion to the electrical apparatus 900 before the electrical apparatus main body 90 suffers from a corrosive damage, which makes it possible for the user to take necessary countermeasures such as repair or replacement of the electrical apparatus main body 90.

Second Embodiment

In the second embodiment, a configuration that notifies the user of the degree of progress of corrosion to the electrical apparatus 900 in a stepwise manner will be described. The overall configuration of the electrical apparatus according to the second embodiment is the same as the overall configuration of the electrical apparatus 900 (see FIG. 1) according to the first embodiment except that the corrosion detection sensor is different. The configuration of the corrosion detection sensor according to the second embodiment is the same as the configuration of the corrosion detection sensor 101 (see FIG. 1) according to the first embodiment except for the configuration of the sensor body. Therefore, for the sake of clarity of the drawings, only the sensor body is illustrated in the drawings.

Figure 10:
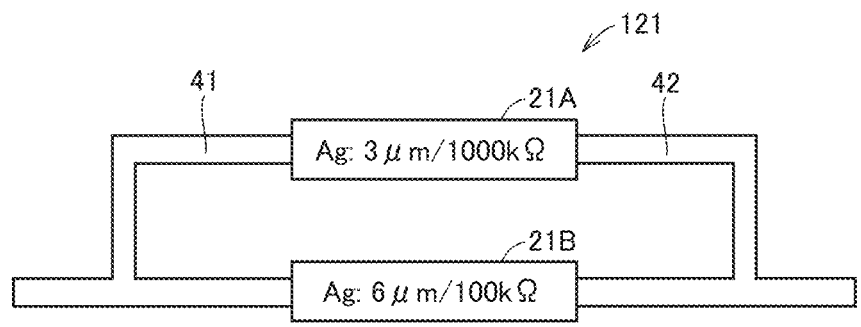
FIG. 10 is a diagram illustrating an example configuration of a sensor body according to a second embodiment.

FIG. 10 is a diagram illustrating an example configuration of a sensor body according to the second embodiment. With reference to FIG. 10, a sensor body 121 includes two corrosion detection structures 21A and 21B connected in parallel. The configuration of each of the corrosion detection structures 21A and 21B is the same as the configuration of the corrosion detection structure 21 illustrated in FIGS. 3 and 4.

The material of the metal thin film 8 provided in the corrosion detection structure 21A is the same as the material of the metal thin film 8 provided in the corrosion detection structure 21B. However, the film thickness of the metal thin film 8 provided in the corrosion detection structure 21A is different from the film thickness of the metal thin film 8 provided in the corrosion detection structure 21B. The metal thin film 8 provided in the corrosion detection structure 21A is thinner than the metal thin film 8 provided in the corrosion detection structure 21B. In addition, the resistance value of the corrosion detection structure 21A is greater than the resistance value of the corrosion detection structure 21B.

For example, in the first example of the second embodiment, both the material of the metal thin film 8 provided in the corrosion detection structure 21A and the material of the metal thin film 8 provided in the corrosion detection structure 21B were silver. The film thickness of the metal thin film 8 provided in the corrosion detection structure 21A was 3 μm. According to the definition of danger level by the above expression (1), the film thickness of the metal thin film 8 provided in the corrosion detection structure 21A corresponds to a danger level of 25% (=3 μm/12 μm). The film thickness of the metal thin film 8 provided in the corrosion detection structure 21B was 6 μm. The film thickness of the metal thin film 8 provided in the corrosion detection structure 21B corresponds to a danger level of 50% (=6 μm/12 μm). The resistance value of the corrosion detection structure 21A was 1000 kΩ, and the resistance value of the corrosion detection structure 21B was 100 kΩ.

In the second embodiment, two reference resistances are prepared for comparing with the combined resistance X. A first reference resistance REF1 is determined based on the resistance (the combined resistance X) between both ends of the sensor body 121 when the corrosion detection structure 21A having a thin metal thin film 8 among the two corrosion detection structures 21A and 21B is corrosively disconnected while the corrosion detection structure 21B having a thick metal thin film 8 is not disconnected. A second reference resistance REF2 is determined based on the combined resistance X of the sensor body 121 when both of the two corrosion detection structures 21A and 21B are corrosively disconnected.

More specifically, the first reference resistance REF1 is a value obtained by multiplying the combined resistance X before corrosion (the initial combined resistance X0) by a first coefficient K1 greater than 1 (REF1=K1×X0, K1>1). The second reference resistance REF2 is a value obtained by multiplying the initial combined resistance X0 by a second coefficient K2 greater than 1 (REF2=K2×X0, K2>1). The second coefficient K2 is greater than the first coefficient K1 (K2>K1). Therefore, the second reference resistance REF2 is greater than the first reference resistance REF1 (REF2>REF1).

In the first example of the second embodiment, the initial combined resistance X0 is 91 kΩ. The first reference resistance REF1 is set to 92 kΩ, which is 1.2% greater than the initial combined resistance X0. The second reference resistance REF2 is set to 101 kΩ, which is 11% greater than the initial combined resistance X0. In this case, if the combined resistance X becomes greater than the first reference resistance REF1, it means that a disconnection occurs in the corrosion detection structure 21A, in other words, the metal thin film 8 having a film thickness of 3 μm was corrosively disconnected, which indicates that the danger level has reached 25%. If the combined resistance X becomes greater than the second reference resistance REF2, it means that the metal thin film 8 provided in the corrosion detection structure 21B and having a film thickness of 6 μm was corrosively disconnected, which indicates that the danger level has reached 50%.

Figure 11:
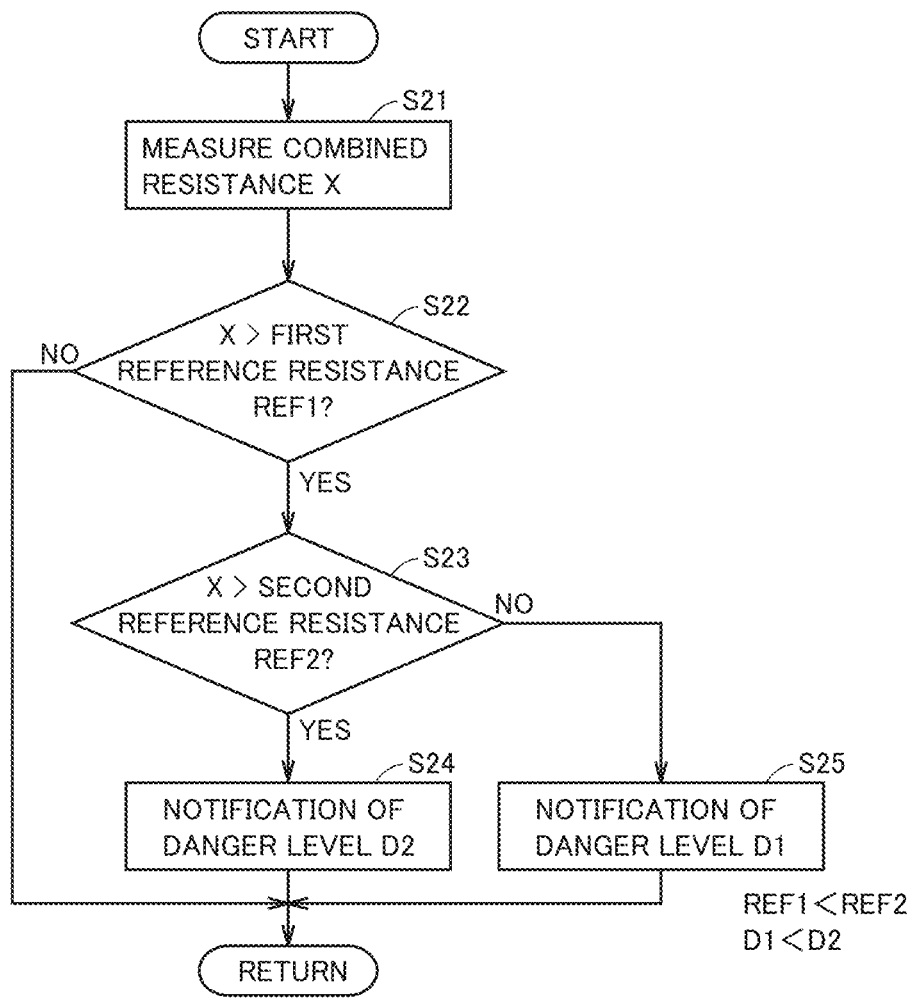
FIG. 11 is a flowchart illustrating a corrosion detection procedure for detecting corrosion to the sensor body illustrated in FIG. 10.

FIG. 11 is a flowchart illustrating a corrosion detection procedure for detecting corrosion to the sensor body 121 illustrated in FIG. 10. With reference to FIG. 11, in S21, the control unit 30 controls the resistance measuring instrument 20 to measure the resistance (combined resistance X) between both ends of sensor body 121.

In S22, the control unit 30 compares the combined resistance X with the first reference resistance REF1 (=92 kΩ). If the combined resistance X is equal to or smaller than the first reference resistance REF1 (NO in S22), the control unit 30 skips the subsequent steps and returns the procedure to the main routine. On the other hand, if the combined resistance X is greater than the first reference resistance REF1 (YES in S22), the control unit 30 proceeds the procedure to S23.

In S23, the control unit 30 compares the combined resistance X with the second reference resistance REF2 (=101 kΩ). If the combined resistance X is equal to or smaller than the second reference resistance REF2 (NO in S23), in other words, if the combined resistance X is greater than the first reference resistance REF1 but is equal to or smaller than the second reference resistance REF2, the control unit 30 proceeds the procedure to S25. In S25, the control unit 30 controls the notification unit 40 to display a danger level D1 (=25%). If the combined resistance X is greater than the second reference resistance REF2 (YES in S23), the control unit 30 proceeds the procedure to S24. In S24, the control unit 30 controls the notification unit 40 to display a danger level D2.

For example, when the notification unit 40 is an LED indicator which includes two LEDs, the control unit 30 turns off both of the two LEDs when the danger level is equal to or smaller than D1. When the danger level is greater than D1 but is equal to or smaller than D2, the control unit 30 turns on (or flashes) one LED and turns off the other LED (S25). Further, when the danger level is greater than D2, the control unit 30 turns on both of the two LEDs (S24).

Further, when the notification unit 40 is an LED indicator which includes one LED whose emission color is switchable, the control unit 30 may control the LED to emit light with a color corresponding to each danger level. For example, the control unit 30 may turn off the LED when the danger level is D1 or less, and may control the LED to emit yellow light when the danger level is greater than D1 but is equal to or smaller than D2, and emit red light when the danger level is greater than D2.

Further, when the notification unit 40 is a liquid crystal display, the control unit 30 may control the liquid crystal display to display a numerical value (=25%) representing D1 when the danger level reaches D1, and display a numerical value (=50%) representing D2 when the danger level reaches D2.

First Example of Second Embodiment in an environment having a temperature of 75° C. and containing sublimed sulfur, an exposure test was performed on the electrical apparatus 900 (specifically, an inverter) equipped with a corrosion detection sensor including the sensor body 121 illustrated in FIG. 10. The initial combined resistance X0 was 91 kΩ. After 10 days from the start of the exposure test, the combined resistance X became greater than the first reference resistance REF1 (=92 kΩ), and the increase in resistance was confirmed to be caused by the corrosive disconnection of the corrosion detection structure 21A (the silver thin film having a film thickness of 3 μm). When the exposure test was continued thereafter, the combined resistance X became greater than the second reference resistance REF2 (=101 kΩ). The increase in resistance was confirmed to be caused by the corrosive disconnection of the corrosion detection structure 21B (the silver thin film having a film thickness of 6 μm).

Second Example of Second Embodiment

Figure 12:
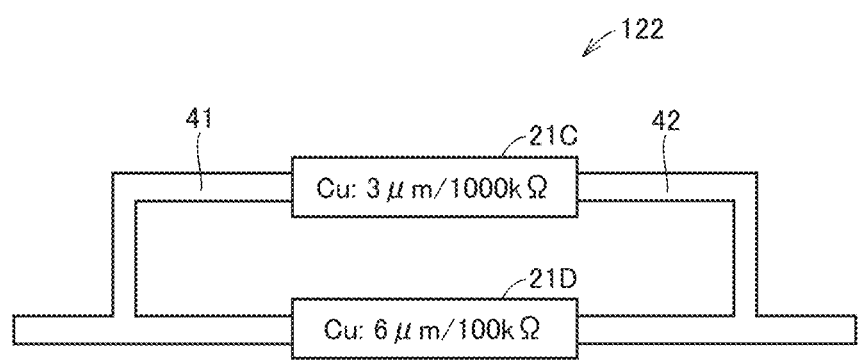
FIG. 12 is a diagram illustrating another example configuration of a sensor body according to the second embodiment.

FIG. 12 is a diagram illustrating another example configuration of a sensor body according to the second embodiment. FIG. 12 shows a specific configuration (the material and film thickness of the metal thin film 8 and the initial resistance of the corrosion detection structure) of the corrosion detection structure according to a second example of the second embodiment. With reference to FIG. 12, the configuration of the sensor body 122 is substantially the same as the configuration of the sensor body 121 (see FIG. 10).

In the second example of the second embodiment, both the material of the metal thin film 8 provided in the corrosion detection structure 21C and the material of the metal thin film 8 provided in the corrosion detection structure 21D were copper. The film thickness of the metal thin film 8 provided in the corrosion detection structure 21C was 3 μm. The film thickness of the metal thin film 8 provided in the corrosion detection structure 21D was 6 μm. The resistance value of the corrosion detection structure 21C was 1000 kΩ, and the resistance value of the corrosion detection structure 21D was 100 kΩ.

In an environment of 40° C./95% RH/(3 ppm. $H_2S$+10 ppm $NO_2$), an exposure test was performed on the electrical apparatus 900 (an inverter) equipped with a corrosion detection sensor including the sensor body 122. The initial combined resistance X0 was 91 kΩ. After 1.2 days from the start of the exposure test, the combined resistance X became greater than the first reference resistance REF1 (=92 kΩ), and the increase in resistance was confirmed to be caused by the corrosive disconnection of the corrosion detection structure 21C (a copper thin film having a film thickness of 3 μm). When the exposure test was continued thereafter, the combined resistance X became greater than the second reference resistance REF2 (=101 kΩ). The increase in resistance was confirmed to be caused by the corrosive disconnection of the corrosion detection structure 21D (a copper thin film having a film thickness of 6 μm).

Third Example of Second Embodiment

Figure 13:
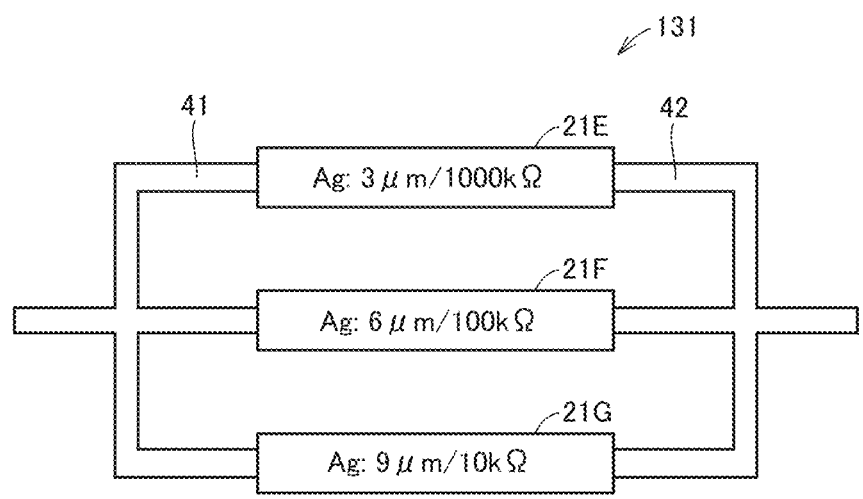
FIG. 13 is a diagram illustrating still another example configuration of a sensor body according to the second embodiment.

FIG. 13 is a diagram illustrating still another example configuration of a sensor body according to the second embodiment. FIG. 13 shows a specific configuration of the corrosion detection structure according to a third example of the second embodiment. With reference to FIG. 13, the sensor body 131 includes three corrosion detection structures 21E to 21G connected in parallel. The configuration of each of the corrosion detection structures 21E to 21G is substantially the same as the configuration of the corrosion detection structure 21 illustrated in FIGS. 3 and 4.

The material of the metal thin film 8 provided in the corrosion detection structure 21E, the material of the metal thin film 8 provided in the corrosion detection structure 21F, and the material of the metal thin film 8 provided in the corrosion detection structure 21G are the same. On the other hand, the film thickness of the metal thin film 8 provided in the corrosion detection structure 21E, the film thickness of the metal thin film 8 provided in the corrosion detection structure 21F, and the film thickness of the metal thin film 8 provided in the corrosion detection structure 21G are different from each other. The metal thin film 8 provided in the corrosion detection structure 21E is the thinnest, the metal thin film 8 provided in the corrosion detection structure 21F is the second thinnest, and the metal thin film 8 provided in the corrosion detection structure 21G is the thickest. Preferably, the resistance value of the corrosion detection structure 21E is the greatest, the resistance value of the corrosion detection structure 21F is the second greatest, and the resistance value of the corrosion detection structure 21G is the lowest.

In the third example of the second embodiment, the material of the metal thin film 8 provided in the corrosion detection structure 21E, the material of the metal thin film 8 provided in the corrosion detection structure 21F, and the material of the metal thin film 8 provided in the corrosion detection structure 21G were all silver. The film thickness of the metal thin film 8 provided in the corrosion detection structure 21E was 3 μm. This film thickness corresponds to a danger level of 25% (=3 μm/12 μm). The film thickness of the metal thin film 8 provided in the corrosion detection structure 21F was 6 μm. This film thickness corresponds to a danger level of 50% (=6 μm/12 μm). The film thickness of the metal thin film 8 provided in the corrosion detection structure 21G was 9 μm. This film thickness corresponds to a danger level of 75% (=9 μm/12 μm). The resistance value of the corrosion detection structure 21E was 1000 kΩ, the resistance value of the corrosion detection structure 21F was 100 kΩ, and the resistance value of the corrosion detection structure 21G was 10 kΩ.

In the configuration illustrated in FIG. 13, three reference resistances (a first reference resistance REF1 to a third reference resistance REF3) are prepared for comparing with the combined resistance X. The first reference resistance REF1 is determined based on the combined resistance X between both ends of the sensor body 131 when the corrosion detection structure 21E having the thinnest metal thin film 8 among the three corrosion detection structures 21E to 21G is corrosively disconnected while the other two corrosion detection structures 21F and 21G are not disconnected. The second reference resistance REF2 is determined based on the combined resistance X between both ends of the sensor body 131 when the corrosion detection structures 21E and 21F are corrosively disconnected while the corrosion detection structure 21G having the thickest metal thin film 8 is not disconnected. The third reference resistance REF3 is determined based on the combined resistance X of the sensor body 131 when the three corrosion detection structures 21E to 21G are all corrosively disconnected.

More specifically, the first reference resistance REF1 is a value obtained by multiplying the combined resistance X before corrosion (the initial combined resistance X0) by a first coefficient K1 greater than 1 (REF1=K1×X0, K1>1). The second reference resistance REF2 is a value obtained by multiplying the initial combined resistance X0 by a second coefficient K2 greater than 1 (REF2=K2×X0, K2>1). The third reference resistance REF3 is a value obtained by multiplying the initial combined resistance X0 by a third coefficient K3 greater than 1 (REF3=K3×X0, K3>1). The third coefficient K3, the second coefficient K2, and the first coefficient K1 increase in this order (K3>K2>K1). Therefore, the third reference resistance REF3, the second reference resistance REF2, and the first reference resistance REF1 increase in this order (REF3>REF2>REF1).

In the third example of the second embodiment, the initial combined resistance X0 was 9.01 kΩ. The first reference resistance REF1 was set to 9.02 kΩ, which is 0.1% greater than the initial combined resistance X0. The second reference resistance REF2 was set to 9.10 kΩ, which is 1% greater than the initial combined resistance X0. The third reference resistance REF3 was set to 10.1 kΩ, which is 12% greater than the initial combined resistance X0. In this case, if the combined resistance X becomes greater than the first reference resistance REF1, it means that the metal thin film 8 provided in the corrosion detection structure 21E and having a film thickness of 3 μm was corrosively disconnected, which indicates that the danger level has reached 25%. If the combined resistance X becomes greater than the second reference resistance REF2, it means that the metal thin film 8 provided in the corrosion detection structure 21F and having a film thickness of 6 μm was further corrosively disconnected, which indicates that the danger level has reached 50%. If the combined resistance X becomes greater than the third reference resistance REF3, it means that the metal thin film 8 provided in the corrosion detection structure 21G and having a film thickness of 9 μm was further corrosively disconnected, which indicates that the danger level has reached 75%.

Figure 14:
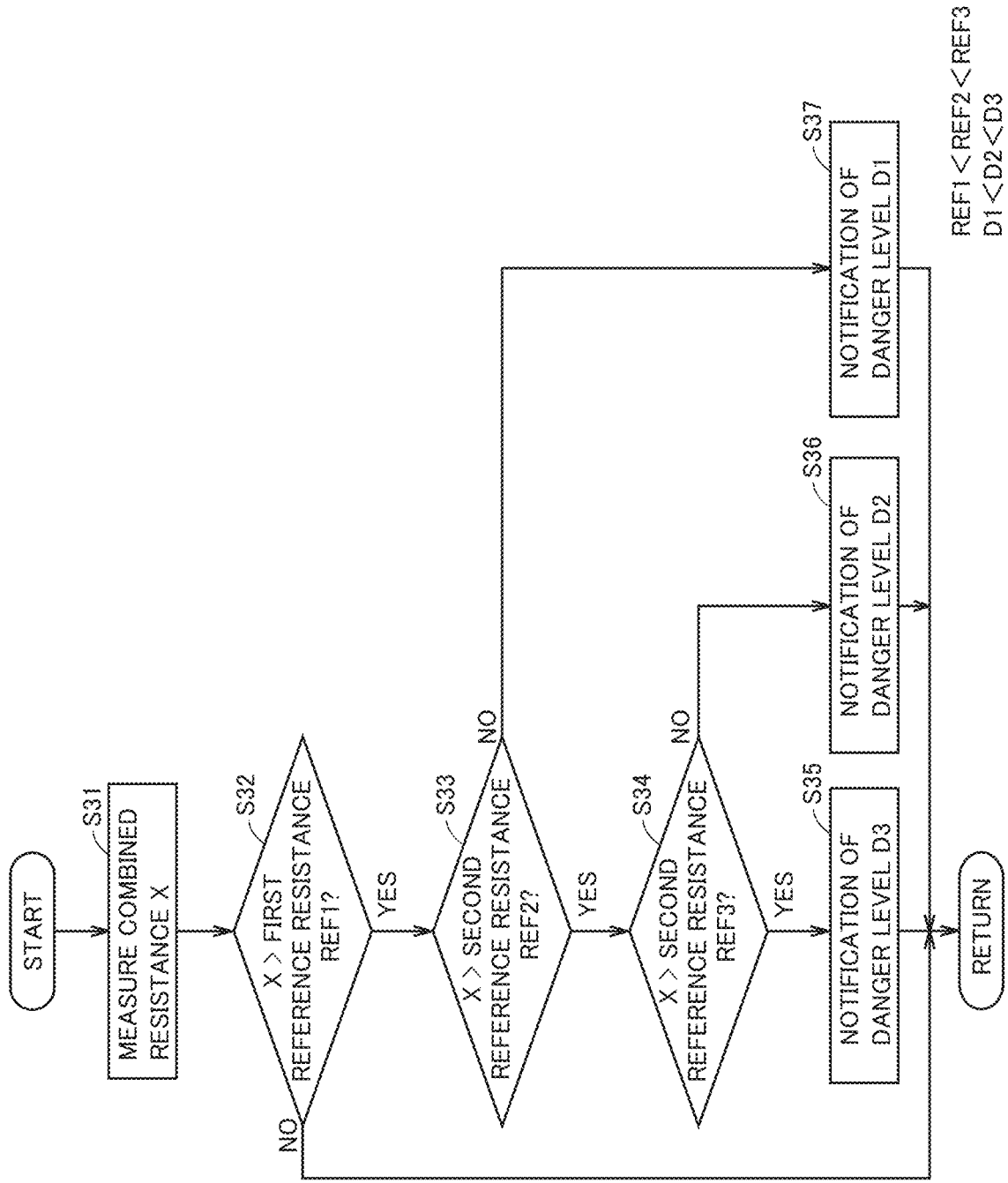
FIG. 14 is a flowchart illustrating a corrosion detection procedure for detecting corrosion to the sensor body illustrated in FIG. 13.

FIG. 14 is a flowchart illustrating a corrosion detection procedure for detecting corrosion to the sensor body 131 illustrated in FIG. 13. With reference to FIG. 14, in S31, the control unit 30 controls the resistance measuring instrument 20 to measure the resistance (combined resistance X) between both ends of sensor body 131.

In S32, the control unit 30 compares the combined resistance X with the first reference resistance REF1 (=9.02 kΩ). If the combined resistance X is equal to or smaller than the first reference resistance REF1 (NO in S32), the control unit 30 skips the subsequent steps and returns the procedure to the main routine. On the other hand, if the combined resistance X is greater than the first reference resistance REF1 (YES in S32), the control unit 30 proceeds the procedure to S33.

In S33, the control unit 30 compares the combined resistance X with the second reference resistance REF2 (=9.10 kΩ). If the combined resistance X is equal to or smaller than the second reference resistance REF2 (NO in S33), in other words, if the combined resistance X is greater than the first reference resistance REF1 but is equal to or smaller than the second reference resistance REF2, the control unit 30 proceeds the procedure to S37. On the other hand, if the combined resistance X is greater than the second reference resistance REF2 (YES in S33), the control unit 30 proceeds the procedure to S34.

In S34, the control unit 30 compares the combined resistance X with the third reference resistance REF3 (=10.1 kΩ). If the combined resistance X is equal to or smaller than the third reference resistance REF2 (NO in S34), in other words, if the combined resistance X is greater than the second reference resistance REF2 but is equal to or smaller than the third reference resistance REF3, the control unit 30 proceeds the procedure to S36. On the other hand, if the combined resistance X is greater than the third reference resistance REF3 (YES in S34), the control unit 30 proceeds the procedure to S35.

In S37, the control unit 30 controls the notification unit 40 to notify the user of the danger level D1 (=25%). In S36, the control unit 30 controls the notification unit 40 to notify the user of the danger level D2 (=50%). In S35, the control unit 30 controls the notification unit 40 to notify the user of the danger level D3 (=75%).

The notification mode of each of the danger levels D1 to D3 to the user is the same as the notification mode described with reference to FIG. 11. Specifically, when the notification unit 40 is an LED indicator which includes three LEDs, the control unit 30 turns off all of the three LEDs when the danger level is equal to or smaller than D1. When the danger level is greater than D1 but is equal to or smaller than D2, the control unit 30 turns on one LED and turns off the other two LEDs. Further, when the danger level is greater than D2 but is equal to or smaller than D3, the control unit 30 turns on two LEDs and turns off one LED When the danger level is greater than D3, the control unit 30 turns on all of the three LEDs.

Further, when the notification unit 40 is an LED indicator which includes one LED whose emission color is switchable, the control unit 30 may control the LED to emit light with a color corresponding to each danger level. For example, the control unit 30 may turn off the LED when the danger level is D1 or less, and may control the LED to emit green light when the danger level is greater than D1 and D2 or less, emit yellow light when the danger level is greater than D2 and D3 or less, and emit red light when the danger level is greater than D3.

Further, when the notification unit 40 is a liquid crystal display, the control unit 30 may control the liquid crystal display to display a numerical value (=25%) representing D1 when the danger level reaches D1, a numerical value (=50%) representing D2 when the danger level reaches D2, and a numerical value (=75%) representing D3 when the danger level reaches D3.

In an environment having a temperature of 75° C. and containing sublimed sulfur, an exposure test was performed on the electrical apparatus 900 (an inverter) equipped with a corrosion detection sensor including a sensor body 131 illustrated in FIG. 13. The initial combined resistance X0 was 9.01 kΩ. After 10 days from the start of the exposure test, the combined resistance X became greater than the first reference resistance REF1 (=9.02 kΩ), and the increase in resistance was confirmed to be caused by the corrosive disconnection of the corrosion detection structure 21E. When the exposure test was continued thereafter, the combined resistance X became greater than the second reference resistance REF2 (=9.10 kΩ). The increase in resistance was confirmed to be caused by the corrosive disconnection of the corrosion detection structure 21F. When the exposure test was further continued, the combined resistance X became greater than the third reference resistance REF3 (=10.1 kΩ). The increase in resistance was confirmed to be caused by the corrosive disconnection of the corrosion detection structure 21G.

Fourth Example of Second Embodiment

Figure 15:
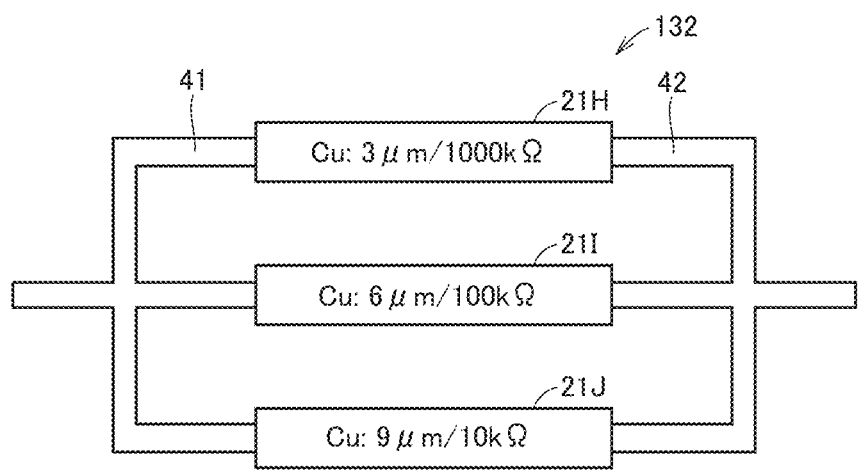
FIG. 15 is a diagram illustrating still another example configuration of a sensor body according to the second embodiment.

FIG. 15 is a diagram illustrating still another example configuration of a sensor body according to the second embodiment. FIG. 15 shows a specific configuration of corrosion detection structures 21H to 21J provided in a sensor body 132 according to the fourth example of the second embodiment. The configuration of the sensor body 132 is substantially the same as the configuration of the sensor body 131 (see FIG. 13).

The material of the metal thin film 8 provided in the corrosion detection structure 21H, the material of the metal thin film 8 provided in the corrosion detection structure 21I, and the material of the metal thin film 8 provided in the corrosion detection structure 21J were all copper. The film thickness of the metal thin film 8 provided in the corrosion detection structure 21H was 3 μm. The film thickness of the metal thin film 8 provided in the corrosion detection structure 21I was 6 μm. The film thickness of the metal thin film 8 provided in the corrosion detection structure 21J was 9 μm. The resistance value of the corrosion detection structure 21H was 1000 kΩ, the resistance value of the corrosion detection structure 21I was 100 kΩ, and the resistance value of the corrosion detection structure 21J was 10 kΩ.

In an environment of 40° C./95% RH/(3 ppm $H_2S$+10 ppm $NO_2$), an exposure test was performed on the electrical apparatus 900 (an inverter) equipped with a corrosion detection sensor including a sensor body 132. The initial combined resistance X0 was 9.01 kΩ. After 10 days from the start of the exposure test, the combined resistance X became greater than the first reference resistance REF1 (=9.02 kΩ), and the increase in resistance was confirmed to be caused by the corrosive disconnection of the corrosion detection structure 21H (a copper thin film having a film thickness of 3 μm). When the exposure test was continued thereafter, the combined resistance X became greater than the second reference resistance REF2 (=9.10 kΩ). The increase in resistance was confirmed to be caused by the corrosive disconnection of the corrosion detection structure 21I (a copper thin film having a film thickness of 6 μm). After that, the combined resistance X became greater than the third reference resistance REF3 (=10.1 kΩ). The increase in resistance was confirmed to be caused by the corrosive disconnection of the corrosion detection structure 21J (a copper thin film having a film thickness of 9 μm).

As described above, according to the second embodiment, the degree of progress of corrosion to the electrical apparatus caused by the corrosive gas may be determined with a simple configuration as in the first embodiment. In the second embodiment, a plurality of corrosion detection structures are connected in parallel, and a plurality of danger levels are set. Thus, the degree of progress of corrosion may be notified to the user in a stepwise manner in more detail.

In FIGS. 10, 12, 13 and 15, it is described that two or three corrosion detection structures are connected in parallel, and it is acceptable to use four or more corrosion detection structures. When a number of N (N is an integer of 2 or more) corrosion detection structures are used, N parallel circuits are formed. As the number of N becomes greater, the configuration of the corrosion detection sensor becomes more complicated, which makes it possible to notify the degree of progress (the danger level) of corrosion to the user in more detail.

Third Embodiment

The electrical apparatus 900 may be installed in a variety of environments, and may be exposed to a variety of corrosive gases. In the third embodiment, a configuration capable of detecting corrosion caused by a plurality of types of corrosive gases will be described.

Figure 16:
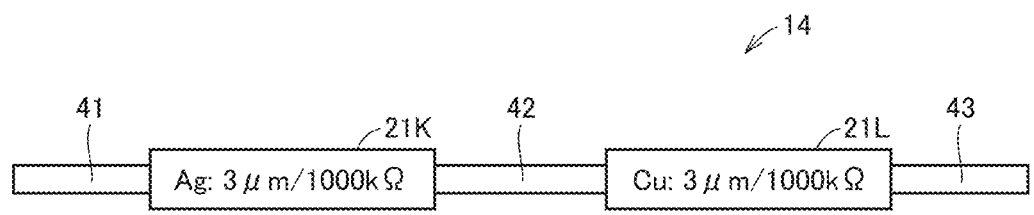
FIG. 16 is a diagram illustrating an example configuration of a sensor body according to a third embodiment.

FIG. 16 is a diagram illustrating an example configuration of a sensor body according to the third embodiment. FIG. 16 shows a specific configuration of corrosion detection structures 21K, 21L provided in a sensor body 14 according to a first example of the third embodiment.

With reference to FIG. 16, the sensor body 14 includes two corrosion detection structures 21K and 21L connected in series, and three wires 41 to 43. The configuration of each of the corrosion detection structures 21K and 21L is substantially the same as the configuration of the corrosion detection structure 21 illustrated in FIGS. 3 and 4. The wire 41 and the wire 42 are spaced from each other. The corrosion detection structure 21K is connected between the wire 41 and the wire 42, and is mounted on the wires 41 and 42 with the solder interposed therebetween. Similarly, the wire 42 and the wire 43 are spaced from each other. The corrosion detection structure 21L is connected between the wire 42 and the wire 43, and is mounted on the wires 42 and 43 the solder interposed therebetween.

The material of the metal thin film 8 provided in the corrosion detection structure 21K is different from the material of the metal thin film 8 provided in the corrosion detection structure 21L. In the present embodiment, it is essential that the corrosion detection structures 21K and 21L connected in series have different materials.

The sensitivity of the metal thin film 8 to a corrosive gas depends on the material thereof. Specifically, as described above, silver is sensitive to sublimed sulfur, chlorine gas, and the like. Copper is sensitive to hydrogen sulfide, sulfur dioxide, nitrogen dioxide, and the like. When sublimed sulfur or the like is present in an environment where the electrical apparatus 900 is installed, the corrosion rate of silver is faster than the corrosion rate of copper. Therefore, the degree of progress (the danger level) of corrosion to the electrical apparatus 900 caused by sublimed sulfur or the like may be evaluated by using a corrosion detection structure including a silver thin film. On the other hand, when hydrogen sulfide or the like is present in an environment where the electrical apparatus 900 is installed, the corrosion rate of copper is faster than the corrosion rate of silver. Therefore, the danger level of corrosion to the electrical apparatus 900 caused by hydrogen sulfide or the like may be evaluated by using a corrosion detection structure including a copper thin film.

In the first example of the third embodiment, the film thickness of the metal thin film 8 provided in the corrosion detection structure 21K is equal to the film thickness of the metal thin film 8 provided in the corrosion detection structure 21L. However, these film thicknesses may be different from each other. The film thickness of each metal thin film 8 may be appropriately set in consideration of the corrosion rate of each material to be corroded by different type or concentration of the corrosive gas, the danger level to be notified to the user, or the like.

In the first example of the third embodiment, the resistance value of the corrosion detection structure 21K is equal to the resistance value of the corrosion detection structure 21L. As long as the corrosion detection sensor according to the present disclosure may sense an increase in resistance caused by the corrosive disconnection, it is not essential that the two resistance values are equal to each other. However, by making the two resistance values equal to each other, it is possible to standardize the specifications (the material, the size and the like) of the resistor 9, which makes easier the manufacture of the corrosion detection structures 21K and 21L.

In the first example of the third embodiment, the material of the metal thin film 8 provided in the corrosion detection structure 21K was silver, and the material of the metal thin film 8 provided in the corrosion detection structure 21L was copper. The film thickness of the metal thin film 8 provided in the corrosion detection structure 21K was 3 μm, and the film thickness of the metal thin film 8 provided in the corrosion detection structure 21L was also 3 μm. In the case where the maximum reduction amount of each metal thin film is 12 μm regardless of whether the material of the metal thin film 8 is silver or copper, this film thickness corresponds to a danger level of 25% (=3 μm/12 μm). The resistance value of the corrosion detection structure 21K and the resistance value of the corrosion detection structure 21L were 1000 kΩ.

Also in the present embodiment, a reference resistance REF is prepared for comparing with the combined resistance X. The reference resistance REF is determined based on the combined resistance X between both ends of the sensor body 14 when at least one of the two corrosion detection structures 21K and 21L is corrosively disconnected. More specifically, the reference resistance REF is a value obtained by multiplying the initial combined resistance X0 before corrosion by a coefficient K greater than 1 (REF=K×X0, K>1).

The corrosion detection procedure performed by using a corrosion detection sensor including the sensor body 14 illustrated in FIG. 16 is the same as the procedure described in the first embodiment (see the flowchart of FIG. 9), and the description thereof will not be repeated.

First Example of Third Embodiment

In an environment having a temperature of 75° C. and containing sublimed sulfur, an exposure test was performed on the electrical apparatus 900 (an inverter) equipped with a corrosion detection sensor including the sensor body 14 illustrated in FIG. 16. The initial combined resistance X0 was 2000 kΩ. The reference resistance REF was set to 2020 kΩ, which is 1% greater than the initial combined resistance X0. After 10 days from the start of the exposure test, the combined resistance X became greater than the reference resistance REF, and the increase in resistance was confirmed to be caused by the corrosive disconnection of the corrosion detection structure 21K (a silver thin film having a film thickness of 3 μm).

Second Example of Third Embodiment

Figure 17:
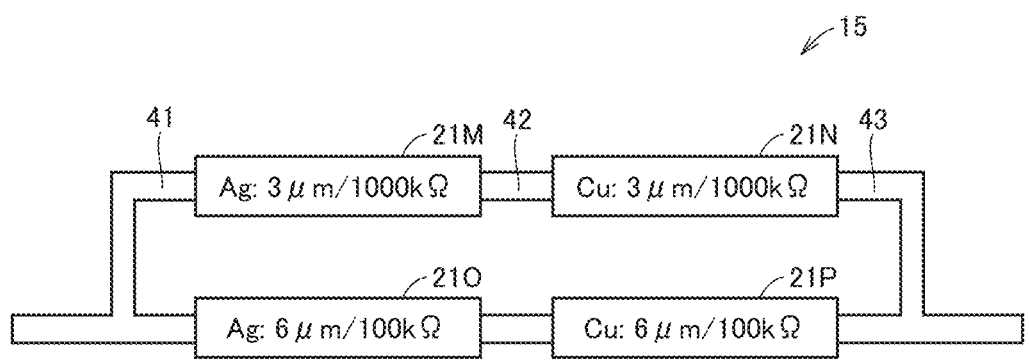
FIG. 17 is a diagram illustrating another example configuration of a sensor body according to the third embodiment.

FIG. 17 is a diagram illustrating an example configuration of a sensor body according to the third embodiment. FIG. 17 shows a specific configuration of corrosion detection structures provided in a sensor body 15 according to a second example of the third embodiment.

With reference to FIG. 17, the sensor body 15 includes four corrosion detection structures 21M to 21P and three wires 41 to 43. The corrosion detection structure 21M and the corrosion detection structure 21N are connected in series by the wire 42. The corrosion detection structure 21O and the corrosion detection structure 21P are connected in series by the wire 42. Further, the corrosion detection structures 21M and 21N are connected in parallel to the corrosion detection structures 21O and 21P between the wire 41 and the wire 43. The configuration of each of the corrosion detection structures 21M to 21P is substantially the same as the configuration of the corrosion detection structure 21 illustrated in FIGS. 3 and 4.

The material of the metal thin film 8 (corresponding to the "first thin film" according to the present disclosure) provided in the corrosion detection structure 21M is different from the material of the metal thin film 8 (corresponding to the "second thin film" according to the present disclosure) provided in the corrosion detection structure 21N. The material of the metal thin film 8 (corresponding to the "third thin film" according to the present disclosure) provided in the corrosion detection structure 21O is different from the material of the metal thin film 8 (corresponding to the "fourth thin film" according to the present disclosure) provided in the corrosion detection structure 21P. The resistance value of the corrosion detection structure 21M is equal to the resistance value of the corrosion detection structure 21N. The resistance value of the corrosion detection structure 21O is equal to the resistance value of the corrosion detection structure 21P. Further, the resistance value of each of the corrosion detection structures 21M and 21N is greater than the resistance value of each of the corrosion detection structures 21O and 21P.

In the second example of the third embodiment, the material of the metal thin film 8 provided in the corrosion detection structures 21M and 21O was silver, and the material of the metal thin film 8 provided in the corrosion detection structures 21N and 21P was copper. The film thickness of the metal thin film 8 provided in the corrosion detection structures 21M and 21N was 3 μm. This film thickness corresponds to a danger level of 25% (=3 μm/12 μm). The film thickness of the metal thin film 8 provided in the corrosion detection structures 21O and 21P was 6 μm. This film thickness corresponds to a danger level of 50% (=6 μm/12 μm). The resistance value of each of the corrosion detection structures 21M and 21N was 1000 kΩ, and the resistance value of each of the corrosion detection structures 21O and 21P was 100 kΩ.

Two reference resistances (the first reference resistance REF1 and the second reference resistance REF2) are prepared for comparing with the combined resistance X. The first reference resistance REF1 is determined based on the combined resistance X between both ends of the sensor body 15 when at least one of the corrosion detection structures 21M and 21N connected in series is corrosively disconnected. The second reference resistance REF2 is determined based on the combined resistance X between both ends of the sensor body 15 when at least one of the corrosion detection structures 21O and 21P connected in series is corrosively disconnected. The specific setting method using a coefficient is the same as the setting method in the first example (see FIG. 10) of the second embodiment. The corrosion detection procedure performed by using a corrosion detection sensor including the sensor body 15 is the same as the procedure represented by the flowchart illustrated in FIG. 11, and the description thereof will not be repeated.

In an environment having a temperature of 75° C. and containing sublimed sulfur, an exposure test was performed on the electrical apparatus 900 (an inverter) equipped with a corrosion detection sensor including the sensor body 15. The initial combined resistance X0 was 182 kΩ. After 10 days from the start of the exposure test, the combined resistance X became greater than the first reference resistance REF1 (=184 kΩ), and the increase in resistance was confirmed to be caused by the corrosive disconnection of the corrosion detection structure 21M (a silver thin film having a film thickness of 3 μm). When the exposure test was continued thereafter, the combined resistance X became greater than the second reference resistance REF2 (=202 kΩ). The increase in resistance was confirmed to be caused by the corrosive disconnection of the corrosion detection structure 21O (a silver thin film having a film thickness of 6 μm).

Third Example of Third Embodiment

Figure 18:
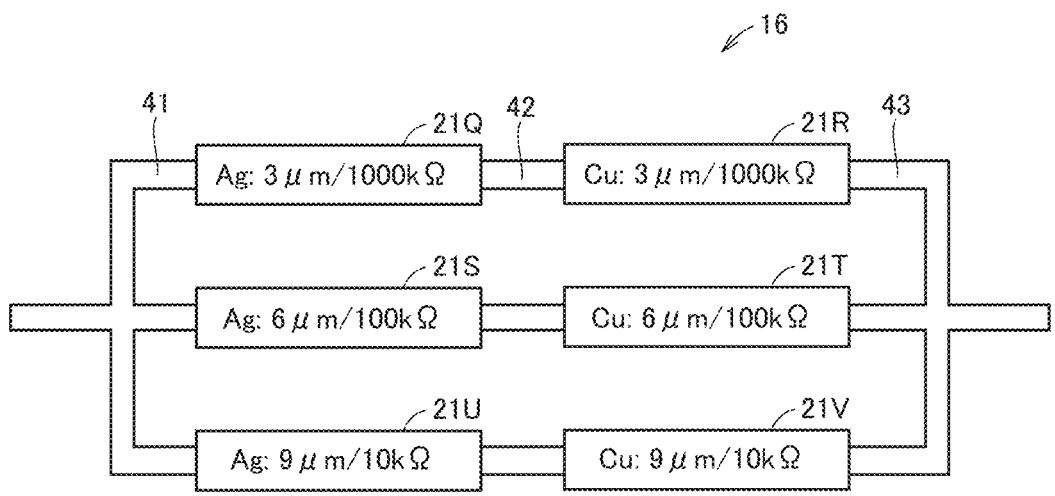
FIG. 18 is a diagram illustrating still another example configuration of a sensor body according to the third embodiment.

FIG. 18 is a diagram illustrating still another example configuration of a sensor body according to the third embodiment. FIG. 18 shows a specific configuration of corrosion detection structures provided in a sensor body 16 according to a third example of the third embodiment.

With reference to FIG. 18, the sensor body 16 includes six corrosion detection structures 21Q to 21V and three wires 41 to 43. The corrosion detection structure 21Q and the corrosion detection structure 21R are connected in series by the wire 42. Similarly, the corrosion detection structure 21S and the corrosion detection structure 21T are connected in series by the wire 42, and the corrosion detection structure 21U and the corrosion detection structure 21V are connected in series by the wire 42. Further, the corrosion detection structures 21Q and 21R, the corrosion detection structures 21S and 21T, and the corrosion detection structures 21U and 21V are connected in parallel between the wire 41 and the wire 43. The configuration of each of the corrosion detection structures 21Q to 21V is substantially the same as the configuration of the corrosion detection structure 21 illustrated in FIGS. 3 and 4.

The material of the metal thin film 8 provided in the corrosion detection structure 21Q is different from the material of the metal thin film 8 provided in the corrosion detection structure 21R. The material of the metal thin film 8 provided in the corrosion detection structure 21S is different from the material of the metal thin film 8 provided in the corrosion detection structure 21T. The material of the metal thin film 8 provided in the corrosion detection structure 21U is different from the material of the metal thin film 8 provided in the corrosion detection structure 21V. The resistance value of the corrosion detection structure 21Q is equal to the resistance value of the corrosion detection structure 21R. The resistance value of the corrosion detection structure 21S is equal to the resistance value of the corrosion detection structure 21T. The resistance value of the corrosion detection structure 21U is equal to the resistance value of the corrosion detection structure 21V. The resistance value of each of the corrosion detection structures 21Q and 21R is greater than the resistance value of each of the corrosion detection structures 21S and 21T. Further, the resistance value of each of the corrosion detection structures 21S and 21T is greater than the resistance value of each of the corrosion detection structures 21U and 21V.

In the third example of the third embodiment, the material of the metal thin film 8 provided in the corrosion detection structures 21Q, 21S and 21U was silver, and the material of the metal thin film 8 provided in the corrosion detection structures 21R, 21T and 21V was copper. The film thickness of the metal thin film 8 provided in the corrosion detection structures 21Q and 21R was 3 µm. This film thickness corresponds to a danger level of 25% (=3 µm/12 µm). The film thickness of the metal thin film 8 provided in the corrosion detection structures 21S and 21T was 6 µm. This film thickness corresponds to a danger level of 50% (=6 µm/12 µm). The film thickness of the metal thin film 8 provided in the corrosion detection structures 21U and 21V was 9 µm. This film thickness corresponds to a danger level of 75% (=9 µm/12 µm). The resistance value of each of the corrosion detection structures 21Q and 21R was 1000 kΩ, the resistance value of each of the corrosion detection structures 21S and 21T was 100 kΩ, and the resistance value of each of the corrosion detection structures 21U and 21V was 10 kΩ.

Three reference resistances (the first reference resistance REF1 to the third reference resistance REF3) are prepared for comparing with the combined resistance X. The first reference resistance REF1 is determined based on the combined resistance X between both ends of the sensor body 16 when at least one of the corrosion detection structures 21Q and 21R connected in series is corrosively disconnected. The second reference resistance REF2 is determined based on the combined resistance X between both ends of the sensor body 16 when at least one of the corrosion detection structures 21S and 21T connected in series is corrosively disconnected. The third reference resistance REF3 is determined based on the combined resistance X between both ends of the sensor body 16 when at least one of the corrosion detection structures 21U and 21V connected in series is corrosively disconnected. The specific setting method using a coefficient is the same as the setting method in the third embodiment (see FIG. 13) of the second embodiment. The corrosion detection procedure performed by using a corrosion detection sensor including the sensor body 16 is the same as the procedure represented by the flowchart illustrated in FIG. 14, and the description thereof will not be repeated.

In an environment of 40° C./95% RH/(3 ppm $H_2S$+10 ppm $NO_2$), an exposure test was performed on the electrical apparatus 900 (an inverter) equipped with a corrosion detection sensor including the sensor body 16. The initial combined resistance X0 was 18 kΩ. After 1.2 days from the start of the exposure test, the combined resistance X became greater than the first reference resistance REF1 (=18.1 kΩ), and the increase in resistance was confirmed to be caused by the corrosive disconnection of the corrosion detection structure 21R (a copper thin film having a film thickness of 3 µm). When the exposure test was continued thereafter, the combined resistance X became greater than the second reference resistance REF2 (=18.3 kΩ), and the increase in resistance was confirmed to be caused by the corrosive disconnection of the corrosion detection structure 21T (a copper thin film having a film thickness of 6 µm). After that, the combined resistance X became greater than the third reference resistance REF3 (=20.2 kΩ), and the increase in resistance was confirmed to be caused by the corrosive disconnection of the corrosion detection structure 21V (a copper thin film having a film thickness of 9 µm).

As described above, according to the third embodiment, the degree of progress of corrosion to the electrical apparatus caused by the corrosive gas may be determined with a simple configuration as in the first embodiment and the second embodiment. Further, in the third embodiment, a plurality of corrosion detection structures different from each other in the material of the metal thin film 8 are connected in series. Since the corrosive property (corrosion rate) differs depending on the combination of the type of corrosive gas and the type of metal, it is possible to detect corrosion to the electrical apparatus 900 caused by a plurality of types of corrosive gas. Further, by combining the serial connection and the parallel connection of the corrosion detection structures, it is possible to notify the user of the degree of progress (the danger level) of corrosion to the electrical apparatus 900 in detail.

Fourth Embodiment

In the first to third embodiments, it is described that both the metal thin film 8 and the resistor 9 are provided inside the corrosion detection structure. However, as to be described hereinafter, the configuration of the corrosion detection structure is not limited thereto. The resistor 9 may be provided outside the corrosion detection structure.

Figure 19:
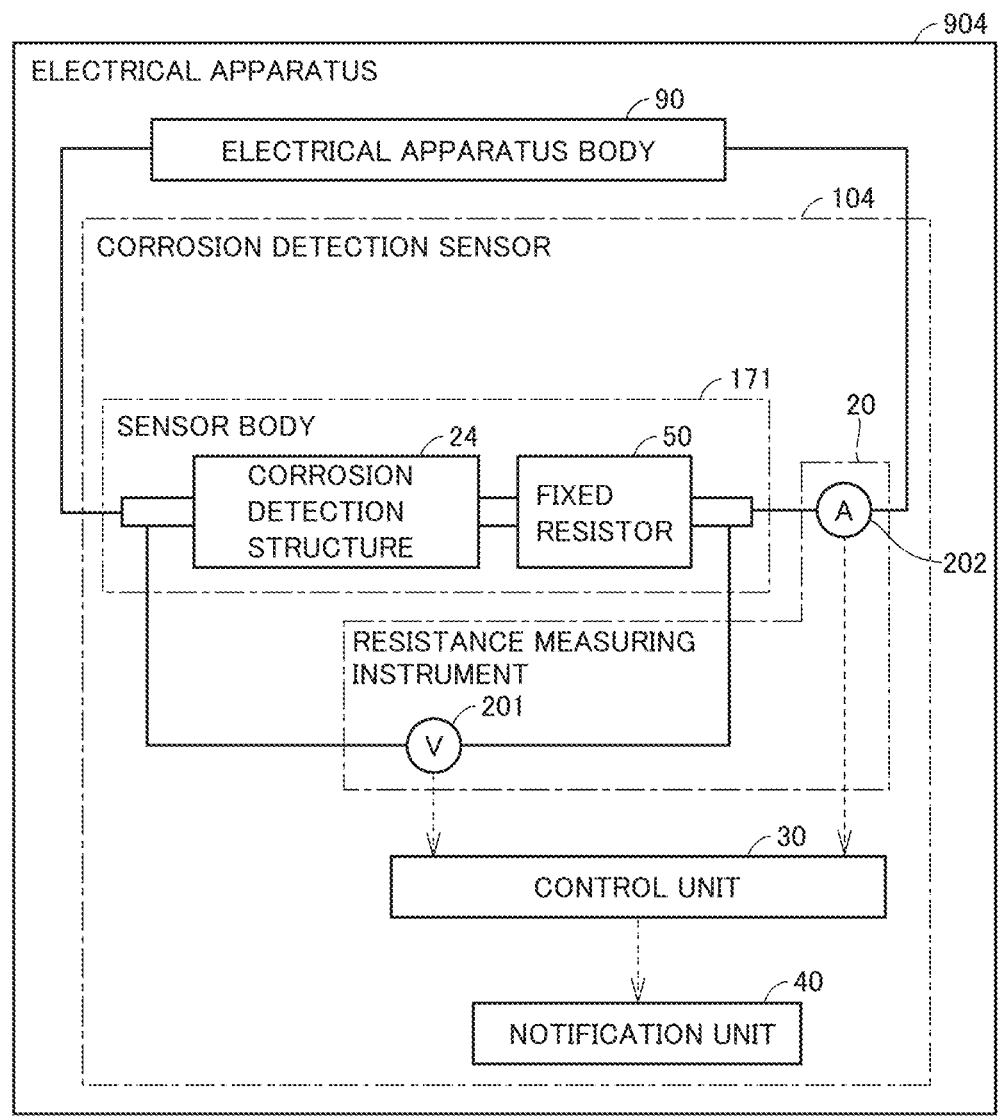
FIG. 19 is a view illustrating an electrical apparatus equipped with a corrosion detection sensor according to a fourth embodiment.

FIG. 19 is a view illustrating an electrical apparatus equipped with a corrosion detection sensor according to a fourth embodiment. With reference to FIG. 19, an electrical apparatus 904 includes a corrosion detection sensor 104. The corrosion detection sensor 104 includes a sensor body 171. The sensor body 171 differs from the sensor body 11 (see FIG. 1) of the first embodiment in that the sensor body 171 includes a corrosion detection structure 24 instead of the corrosion detection structure 21 and further includes a fixed resistor 50. The other configurations of the sensor body 171 are the same as the corresponding configurations of the sensor body 11, and the description thereof will not be repeated. As the configuration of the corrosion detection structure 24, for example, the configuration of the first example of the fourth embodiment to be described later may be adopted.

The fixed resistor 50 may be, for example, a surface-mount resistor (chip resistive element) or a lead wire resistor. The fixed resistor 50 is connected in series to the corrosion detection structure 24. The fixed resistor 50 is resistant to corrosive gases. The resistance value of the fixed resistor 50 is set greater than the resistance value of the metal thin film 8 (see FIGS. 20 and 21). The fixed resistor 50 is another example of the "resistive element" according to the present disclosure.

Figure 20:
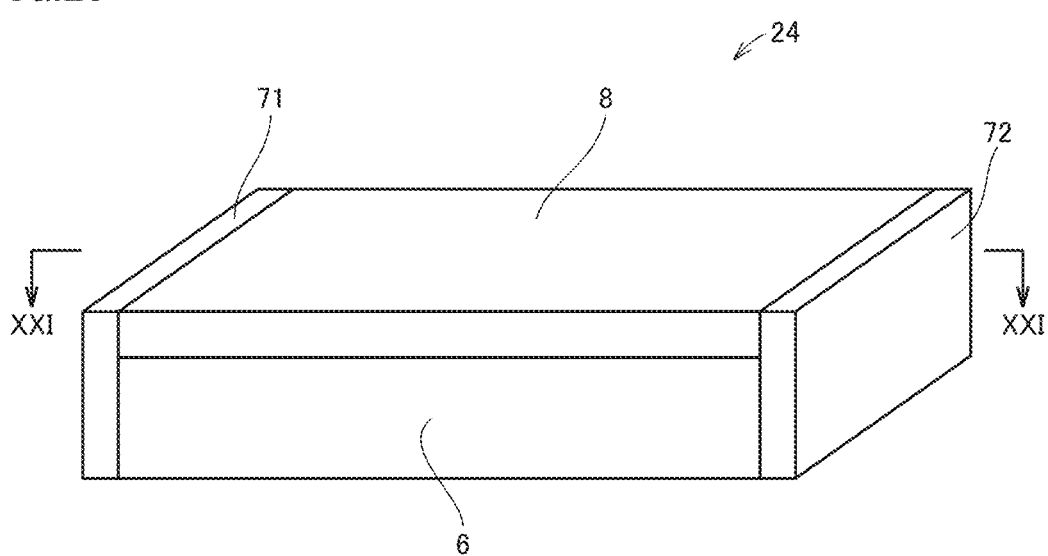
FIG. 20 is a perspective view illustrating an example configuration of a corrosion detection structure according to a fourth embodiment.
Figure 21:
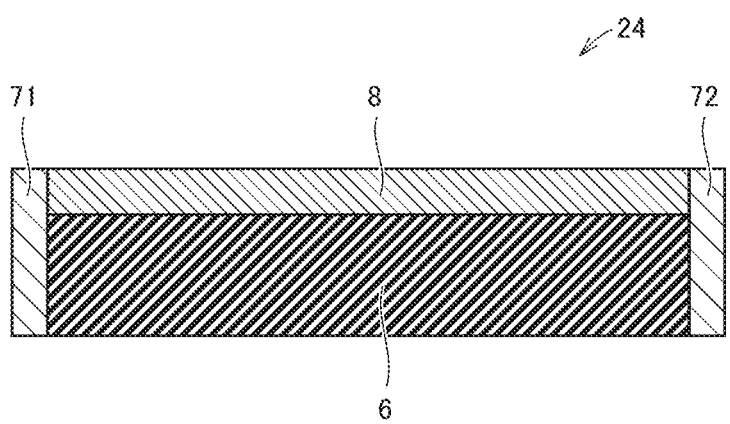
FIG. 21 is a cross-sectional view of the corrosion detection structure taken along line XXI-XXI of FIG. 20.

FIG. 20 is a perspective view illustrating an example configuration of the corrosion detection structure 24 according to the fourth embodiment. FIG. 21 is a cross-sectional view of the corrosion detection structure 24 taken along line XXI-XXI of FIG. 20.

With reference to FIGS. 20 and 21, the corrosion detection structure 24 differs from the corrosion detection structures 21 to 23 (see FIGS. 3, 5 and 7) of the first embodiment in that the corrosion detection structure 24 does not include the resistor 9. In the corrosion detection structure 24, the metal thin film 8 is disposed on the insulating substrate 6 and is electrically connected to the first electrode 71 and the second electrode 72. Similar to the first embodiment, the metal thin film 8 is made of metal (such as silver or copper) which will be corroded by a corrosive gas.

As described above, instead of arranging the resistor 9 inside the corrosion detection structure 21 as a component of the corrosion detection structure 21, a fixed resistor 50 may be disposed outside the corrosion detection structure 24 as a discrete component. Similar to the first embodiment, in the fourth embodiment, it is possible to sense the degree of progress of corrosion to the electrical apparatus 900 caused by the corrosive gas. Since the detection method is the same as the method in the first embodiment (see FIG. 9), the detailed description thereof will not be repeated.

First Example of Fourth Embodiment

In the first example of the fourth embodiment, the material of the metal thin film 8 provided in the corrosion detection structure 24 was silver. The film thickness of the metal thin film 8 was 3 μm. This film thickness corresponds to a danger level of 25% (=3 μm/12 μm). The resistance value of the fixed resistor 50 was 1000 kΩ.

An exposure test was performed on the electrical apparatus 904 (an inverter) equipped with the corrosion detection sensor 104 including the sensor body 171 in an environment containing sublimed sulfur. The initial combined resistance X0 was 1000 kΩ. After 10 days from the start of the exposure test, the combined resistance X became greater than the reference resistance REF (=1010 kΩ), and the increase in resistance was confirmed to be caused by the corrosive disconnection of the corrosion detection structure 24 (a silver thin film having a film thickness of 3 μm).

Figure 22:
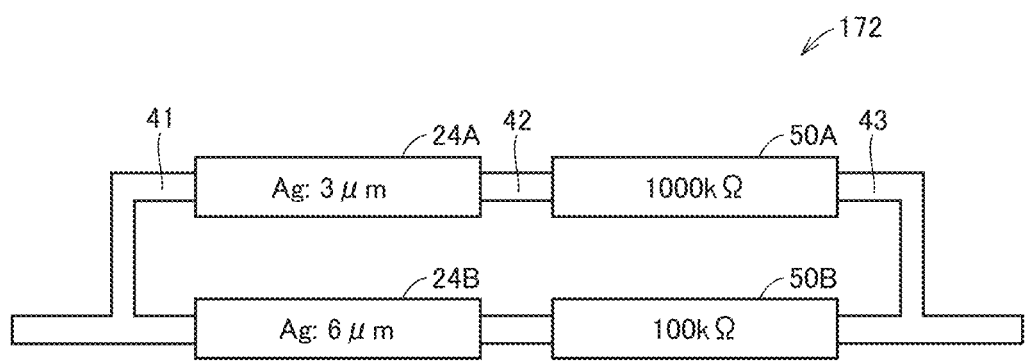
FIG. 22 is a diagram illustrating a configuration of a sensor body according to a second example of the fourth embodiment.

Also in the fourth embodiment, as described in the second embodiment and the third embodiment, two or more series circuits, each of which includes the corrosion detection structure 24 and the fixed resistor 50, may be suitably connected in series or in parallel. The configuration of the sensor body in the fourth embodiment is substantially the same as the configuration of the sensor body described in the second embodiment and the third embodiment except that the fixed resistor 50 is provided outside the corrosion detection structure instead of the resistor 9. Hereinafter, the effectiveness of the corrosion detection sensor is verified mainly based on the corresponding configuration described in the second embodiment and the third embodiment Second Example of Fourth Embodiment FIG. 22 is a diagram illustrating the configuration of a sensor body according to a second example of the fourth embodiment. With reference to FIG. 22, a sensor body 172 is equivalent to the sensor body 121 illustrated in FIG. 10 or the sensor body 122 illustrated in FIG. 12.

In an environment having a temperature of 75° C. and containing sublimed sulfur, an, exposure test was performed on the electrical apparatus 904 (an inverter) equipped with a corrosion detection sensor including the sensor body 172. The initial combined resistance X0 was 91 kΩ. After 10 days from the start of the exposure test, the combined resistance X became greater than the first reference resistance REF1 (=92 kΩ), and the increase in resistance was confirmed to be caused by the corrosive disconnection of the corrosion detection structure 24A (a silver thin film having a film thickness of 3 μm). When the exposure test was continued thereafter, the combined resistance X became greater than the second reference resistance REF2 (=101 kΩ). The increase in resistance was confirmed to be caused by the corrosive disconnection of the corrosion detection structure 24B (a silver thin film having a film thickness of 6 μm).

Third Example of Fourth Embodiment

Figure 23:
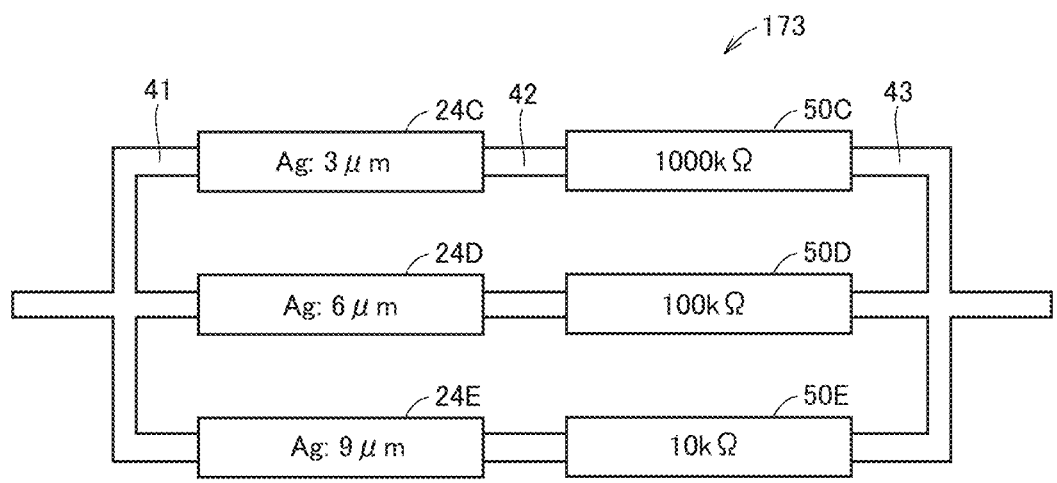
FIG. 23 is a diagram illustrating a configuration of a sensor body according to a third example of the fourth embodiment.

FIG. 23 is a diagram illustrating the configuration of a sensor body according to a third example of the fourth embodiment. With reference to FIG. 23, a sensor body 173 is equivalent to the sensor body 131 illustrated in FIG. 13 or the sensor body 132 illustrated in FIG. 15.

In an environment having a temperature of 75° C. and containing sublimed sulfur, an exposure test was performed on the electrical apparatus 904 (an inverter) equipped with a corrosion detection sensor including the sensor body 173. The initial combined resistance X0 was 9.01 kΩ. After 10 days from the start of the exposure test, the combined resistance X became greater than the first reference resistance REF1 (=9.02 kΩ), and the increase in resistance was confirmed to be caused by the corrosive disconnection of the corrosion detection structure 24C (a silver thin film having a film thickness of 3 μm). When the exposure test was continued thereafter, the combined resistance X became greater than the second reference resistance REF2 (=9.10 kΩ). The increase in resistance was confirmed to be caused by the corrosive disconnection of the corrosion detection structure 24D (a silver thin film having a film thickness of 6 μm). After that, the combined resistance X became greater than the third reference resistance REF3 (=10.1 kΩ). The increase in resistance was confirmed to be caused by the corrosive disconnection of the corrosion detection structure 24E (silver thin film having a film thickness of 9 μm).

Fourth Example of Fourth Embodiment

Figure 24:
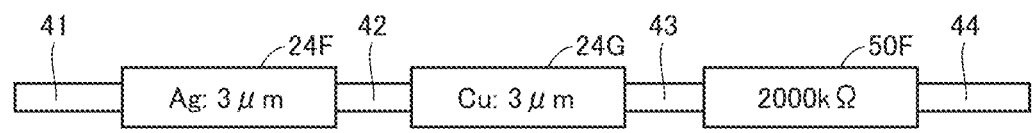
FIG. 24 is a diagram illustrating a configuration of a sensor body according to a fourth example of the fourth embodiment.

FIG. 24 is a diagram illustrating the configuration of a sensor body according to a fourth example of the fourth embodiment. With reference to FIG. 24, a sensor body 174 is equivalent to the sensor body 14 illustrated in FIG. 16.

In an environment having a temperature of 75° C. and containing sublimed sulfur, an exposure test was performed on the electrical apparatus 904 (an inverter) equipped with a corrosion detection sensor including the sensor body 174. The initial combined resistance X0 was 2000 kΩ. After 10 days from the start of the exposure test, the combined resistance X became greater than the reference resistance REF (=2020 kΩ). The increase in resistance was confirmed to be caused by the corrosive disconnection of the corrosion detection structure 24F (a silver thin film having a film thickness of 3 μm).

Fifth Example of Fourth Embodiment

Figure 25:
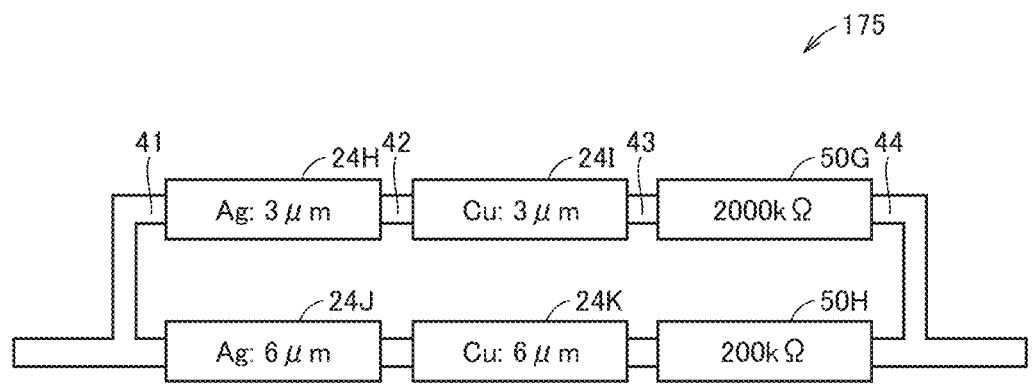
FIG. 25 is a diagram illustrating a configuration of a sensor body according to a fifth example of the fourth embodiment.

FIG. 25 is a diagram illustrating the configuration of a sensor body according to a fifth example of the fourth embodiment. With reference to FIG. 25, a sensor body 175 is equivalent to the sensor body 15 illustrated in FIG. 17.

In an environment having a temperature of 75° C. and containing sublimed sulfur, an exposure test was performed on the electrical apparatus 904 (an inverter) equipped with a corrosion detection sensor including the sensor body 175. The initial combined resistance X0 was 182 kΩ. After 10 days from the start of the exposure test, the combined resistance X became greater than the first reference resistance REF1 (=184 kΩ), and the increase in resistance was confirmed to be caused by the corrosive disconnection of the corrosion detection structure 24H (a silver thin film having a film thickness of 3 μm). When the exposure test was continued thereafter, the combined resistance X became greater than the second reference resistance REF2 (=202 kΩ). The increase in resistance was confirmed to be caused by the corrosive disconnection of the corrosion detection structure 24J (a silver thin film having a film thickness of 6 μm).

Sixth Example of Fourth Embodiment

Figure 26:
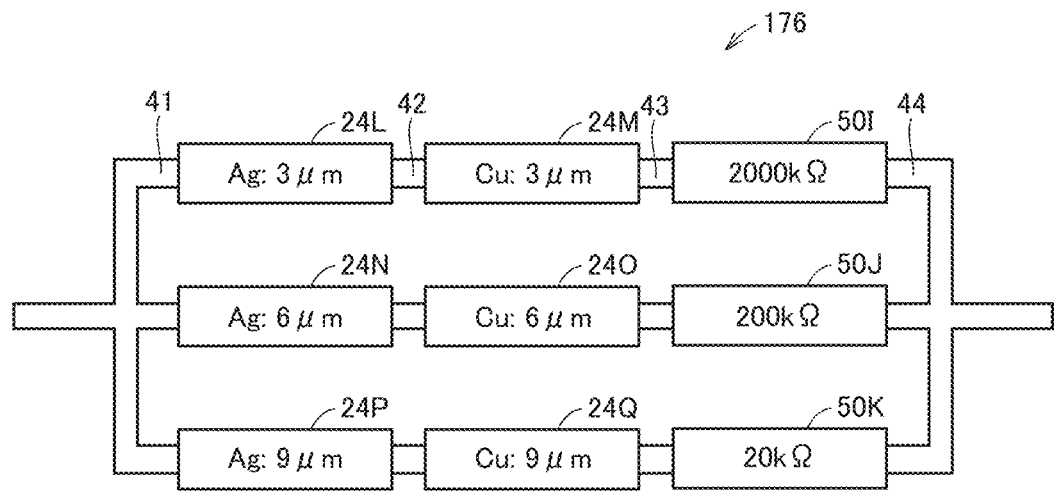
FIG. 26 is a diagram illustrating a configuration of a sensor body according to a sixth example of the fourth embodiment.

FIG. 26 is a diagram illustrating the configuration of a sensor body according to a sixth example of the fourth embodiment. With reference to FIG. 26, a sensor body 176 is equivalent to the sensor body 16 illustrated in FIG. 18.

In an environment having a temperature of 75° C. and containing sublimed sulfur, an exposure test was performed on the electrical apparatus 904 (an inverter) equipped with a corrosion detection sensor including the sensor body 176. The initial combined resistance X0 was 18.0 kΩ. After 10 days from the start of the exposure test, the combined resistance X became greater than the first reference resistance REF1 (=18.1 kΩ), and the increase in resistance was confirmed to be caused by the corrosive disconnection of the corrosion detection structure 24L (a silver thin film having a film thickness of 3 μm). When the exposure test was continued thereafter, the combined resistance X became greater than the second reference resistance REF2 (=18.3 kΩ). The increase in resistance was confirmed to be caused by the corrosive disconnection of the corrosion detection structure 24N (a silver thin film having a film thickness of 6 μm). After that, the combined resistance X became greater than the third reference resistance REF3 (=20.2 kΩ). The increase in resistance was confirmed to be caused by the corrosive disconnection of the corrosion detection structure 24P (a silver thin film having a film thickness of 9 μm).

In each example of the fourth embodiment, it is described that the electrical apparatus 904 is exposed to an environment containing sublimed sulfur so as to confirm the corrosive disconnection of the metal thin film 8 made of silver. However, as described in the second embodiment and the third embodiment, it is possible to confirm the corrosive disconnection of the metal thin film 8 made of copper in an environment of, for example, 40° C./95% RH/(3 ppm $H_2S$+ 10 ppm $NO_2$).

As described above, according to the fourth embodiment, even though the fixed resistor 50 is provided outside the corrosion detection structure, the degree of progress of corrosion to the electrical apparatus 904 caused by the corrosive gas may be determined with a simple configuration as in the first embodiment. In addition, by connecting a plurality of corrosion detection structures in series, it is possible to detect the corrosion to the electrical apparatus 904 caused by a plurality of types of corrosive gases. Further, by connecting a plurality of corrosion detection structures in parallel, it is possible to notify the user of the degree of progress (the danger level) of corrosion to the electrical apparatus 904 in more detail.

Fifth Embodiment

In the fifth embodiment, the materials of the metal thin films in the plurality of corrosion detection structures are different from each other. The overall configuration of the electrical apparatus according to the fifth embodiment is the same as the overall configuration of the electrical apparatus 900 according to the first embodiment (see FIG. 1) except that the different material of the metal thin film.

The material of the metal thin film may be a silver-based alloy or a copper-based alloy in addition to silver or copper. Examples of additive elements in the silver-based alloy or the copper-based alloy include nickel (Ni), titanium (Ti), magnesium (Mg), aluminum (Al), tin (Sn), palladium (Pd), gold (Au), zinc (Zn), and platinum (Pt). The additive element may be added in the range of 0 wt % to 30 wt % with respect to silver or copper. Further, copper may be added to a silver-based alloy in the range of 0 wt % to 30 wt %, and silver may be added to a copper-based alloy in the range of 0 wt % to 30 wt %. These materials are typical metals to be used in electrical apparatus and are sensitive to major corrosive gases, and are therefore suitable as the materials for quantitatively evaluating the corrosive property of an environment to which the electrical apparatus 900 is exposed. The silver-based alloy and the copper-based alloy may include three or more kinds of constituent elements.

Figure 27:
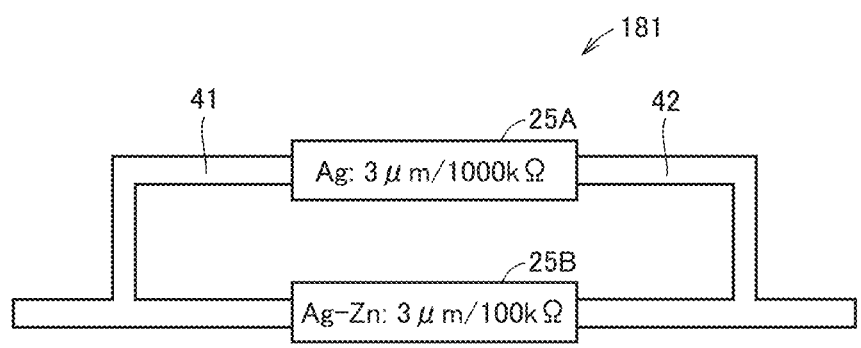
FIG. 27 is a diagram illustrating an example configuration of a sensor body according to a fifth embodiment.

FIG. 27 is a diagram illustrating an example configuration of a sensor body according to the fifth embodiment. FIG. 27 shows a specific configuration of corrosion detection structures provided in a sensor body according to a first example of the fifth embodiment. With reference to FIG. 27, a sensor body 181 includes two corrosion detection structures 25A and 25B connected in parallel. The configuration of each of the corrosion detection structures 25A and 25B is substantially the same as the configuration of the corrosion detection structure 21 illustrated in FIGS. 3 and 4.

The material of the metal thin film 8 provided in the corrosion detection structure 25A is different from the material of the metal thin film 8 provided in the corrosion detection structure 25B. The maximum reduction amount of the material of the metal thin film 8 provided in the corrosion detection structure 25A is greater than the maximum reduction amount of the material of the metal thin film 8 provided in the corrosion detection structure 25B. The film thickness of the metal thin film 8 provided in the corrosion detection structure 25A is equal to the film thickness of the metal thin film 8 provided in the corrosion detection structure 25B. The resistance value of the corrosion detection structure 25A is greater than the resistance value of the corrosion detection structure 25B.

In the first example of the fifth embodiment, the film thickness of the metal thin film 8 provided in the corrosion detection structure 25A and the film thickness of the metal thin film 8 provided in the corrosion detection structure 25B were both 3 μm. The material of the metal thin film 8 provided in the corrosion detection structure 25A was silver, and the material of the metal thin film 8 provided in the corrosion detection structure 25B was a silver-zinc alloy (the addition amount of zinc was 0.4 wt %). The maximum reduction amount of the silver-zinc alloy thin film (the addition amount of zinc was 0.4 wt %) was 9.1 μm. According to the definition of danger level shown in the above expression (1), the film thickness of the metal thin film 8 provided in the corrosion detection structure 25A corresponds to a danger level of 25% (=3 μm/12 μm). The film thickness of the metal thin film 8 provided in the corrosion detection structure 25B corresponds to a danger level of 32% (=3 μm/9.1 μm). The resistance value of the corrosion detection structure 25A was 1000 kΩ, and the resistance value of the corrosion detection structure 25B was 100 kΩ.

In the fifth embodiment, two reference resistances are prepared for comparing with the combined resistance X. As described above, of the two corrosion detection structures 25A and 25B, the maximum reduction amount (=12 μm) of the metal thin film 8 provided in the corrosion detection structure 25A is greater than the maximum reduction amount (=9.1 μm) of the metal thin film 8 provided in the corrosion detection structure 25B. The first reference resistance REF is determined based on the resistance (combined resistance X) between both ends of the sensor body 181 when the corrosion detection structure 25A is corrosively disconnected but the corrosion detection structure 25B is not disconnected. The second reference resistance REF2 is determined based on the combined resistance X of the sensor body 181 when both of the two corrosion detection structures 25A and 25B are corrosively disconnected.

More specifically, the first reference resistance REF1 is a value obtained by multiplying the combined resistance X before corrosion (the initial combined resistance X0) by a first coefficient K1 greater than 1 (REF1=K1×X0, K1>1). The second reference resistance REF2 is a value obtained by multiplying the initial combined resistance X0 by a second coefficient K2 greater than 1 (REF2=K2×X0, K2>1). The second coefficient K2 is greater than the first coefficient K1 (K2>K1). Therefore, the second reference resistance REF2 is greater than the first reference resistance REF1 (REF2>REF1).

In the first example of the fifth embodiment, the initial combined resistance X0 is 91 kΩ. The first reference resistance REF1 is set to 92 kΩ, which is 1.2% greater than the initial combined resistance X0. The second reference resistance REF2 is set to 101 kΩ, which is a value 11% greater than the initial combined resistance X0. In this case, if the combined resistance X becomes greater than the first reference resistance REF1, it means that a disconnection occurs in the corrosion detection structure 25A, in other words, the metal thin film 8 having a maximum reduction amount of 12 μm and a film thickness of 3 μm was corrosively disconnected, which indicates that the danger level has reached 25%. Thereafter, if the combined resistance X becomes greater than the second reference resistance REF2, it means that the metal thin film 8 having a maximum reduction amount of 9.1 μm and a film thickness of 3 μm was corrosively disconnected, which indicates that the danger level has reached 32%.

The flowchart of the corrosion detection procedure in the fifth embodiment is the same as the flowchart of the corrosion detection procedure in the second embodiment (see FIG. 11), and therefore, the detailed description thereof will not be repeated.

First Example of Fifth Embodiment

In an environment having a temperature of 75° C. and containing sublimed sulfur, an exposure test was performed on the electrical apparatus 900 (an inverter) equipped with a corrosion detection sensor including the sensor body 181 illustrated in FIG. 27. The initial combined resistance X0 was 91 kΩ. After 10 days from the start of the exposure test, the combined resistance X became greater than the first reference resistance REF1 (=92 kΩ), and the increase in resistance was confirmed to be caused by the corrosive disconnection of the corrosion detection structure 25A (a silver thin film having a film thickness of 3 μm). When the exposure test was continued thereafter, the combined resistance X became greater than the second reference resistance REF2 (=101 kΩ). The increase in resistance was confirmed to be caused by the corrosive disconnection of the corrosion detection structure 25B (a silver-zinc alloy thin film having a film thickness of 3 μm).

Second Example of Fifth Embodiment

Figure 28:
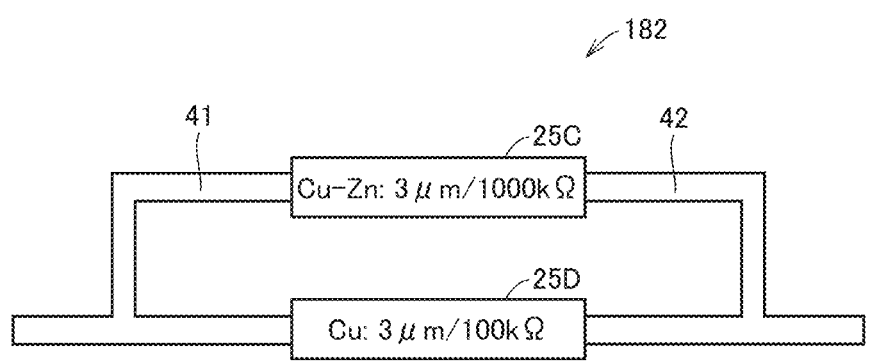
FIG. 28 is a diagram illustrating another example configuration of a sensor body according to the fifth embodiment.

FIG. 28 is a diagram illustrating another example configuration of a sensor body according to the fifth embodiment. FIG. 28 shows a specific configuration of corrosion detection structures provided in a sensor body according to a second example of the fifth embodiment. With reference to FIG. 28, the configuration of the sensor body 182 is substantially the same as the configuration of the sensor body 181 (see FIG. 27).

In the second example of the fifth embodiment, the film thickness of the metal thin film 8 provided in the corrosion detection structure 25C and the film thickness of the metal thin film 8 provided in the corrosion detection structure 25D were both 3 μm. The material of the metal thin film 8 provided in the corrosion detection structure 25C was a copper-zinc alloy (the addition amount of zinc was 30 wt %). The abovementioned film thickness of the metal thin film made of this material corresponds to a danger level of 18% (=3 μm/16.8 μm). The material of the metal thin film 8 provided in the corrosion detection structure 25D was copper. The abovementioned film thickness of the metal thin film made of this material corresponds to a danger level of 25% (=3 μm/12 μm). The resistance value of the corrosion detection structure 25C was 1000 kΩ, and the resistance value of the corrosion detection structure 25D was 100 kΩ.

In an environment of 40° C./95% RH/(3 ppm $H_2S$+10 ppm $NO_2$), an exposure test was performed on the electrical apparatus 900 (an inverter) equipped with a corrosion detection sensor including the sensor body 182. The initial combined resistance X0 was 91 kΩ. After 1.2 days from the start of the exposure test, the combined resistance X became greater than the first reference resistance REF1 (=92 kΩ), and the increase in resistance was confirmed to be caused by the corrosive disconnection of the corrosion detection structure 25C (a copper-zinc alloy thin film having a film thickness of 3 μm). When the exposure test was continued thereafter, the combined resistance X became greater than the second reference resistance REF2 (=101 kΩ). The increase in resistance was confirmed to be caused by the corrosive disconnection of the corrosion detection structure 25D (a copper thin film having a film thickness of 3 μm).

Third Example of Fifth Embodiment

Figure 29:
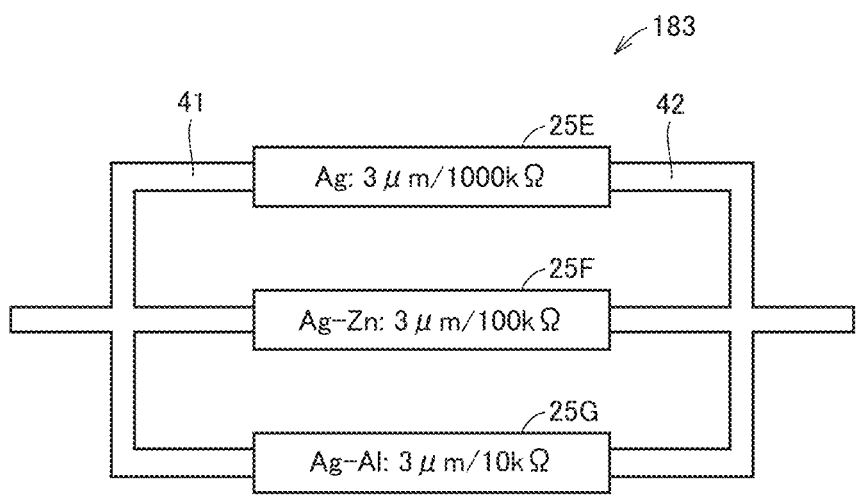
FIG. 29 is a diagram illustrating still another example configuration of a sensor body according to the fifth embodiment.

FIG. 29 is a diagram illustrating still another example configuration of a sensor body according to the fifth embodiment. FIG. 29 shows a specific configuration of corrosion detection structures provided in a sensor body according to a third example of the fifth embodiment. With reference to FIG. 29, a sensor body 183 includes three corrosion detection structures 25E to 25G connected in parallel. The configuration of each of the corrosion detection structures 25E to 25G is substantially the same as the configuration of the corrosion detection structure 21 illustrated in FIGS. 3 and 4.

The film thickness of the metal thin film 8 provided in the corrosion detection structure 25E, the film thickness of the metal thin film 8 provided in the corrosion detection structure 25F, and the film thickness of the metal thin film 8 provided in the corrosion detection structure 25G are equal to each other. On the other hand, the material of the metal thin film 8 provided in the corrosion detection structure 25E, the material of the metal thin film 8 provided in the corrosion detection structure 25F, and the material of the metal thin film 8 provided in the corrosion detection structure 25G are different from each other. The maximum reduction amount of the metal thin film 8 provided in the corrosion detection structure 25E is the greatest, the maximum reduction amount of the metal thin film 8 provided in the corrosion detection structure 25F is the second greatest, and the maximum reduction amount of the metal thin film 8 provided in the corrosion detection structure 25G is the smallest. The resistance value of the corrosion detection structure 25E is the greatest, the resistance value of the corrosion detection structure 25F is the second greatest, and the resistance value of the corrosion detection structure 25G is the lowest.

In the third example of the fifth embodiment, the film thickness of the metal thin film 8 provided in the corrosion detection structure 25E, the film thickness of the metal thin film 8 provided in the corrosion detection structure 25F, and the film thickness of the metal thin film 8 provided in the corrosion detection structure 25G were all 3 μm. The material of the metal thin film 8 provided in the corrosion detection structure 25E was silver. The abovementioned film thickness of the metal thin film made of this material corresponds to a danger level of 25% (=3 μm/12 μm). The material of the metal thin film 8 provided in the corrosion detection structure 25F was a silver-zinc alloy (the addition amount of zinc was 0.4 wt %). The abovementioned film thickness of the metal thin film made of this material corresponds to a danger level of 32% (=3 μm/9.1 μm). The material of the metal thin film 8 provided in the corrosion detection structure 25G was a silver-aluminum alloy (the addition amount of aluminum was 0.4 wt %). The abovementioned film thickness of the metal thin film made of this material corresponds to a danger level of 41% (=3 μm/7.3 μm). The resistance value of the corrosion detection structure 25E was 1000 kΩ, the resistance value of the corrosion detection structure 25F was 100 kΩ, and the resistance value of the corrosion detection structure 25G was 10 kΩ.

In the configuration illustrated in FIG. 29, three reference resistances (the first reference resistance REF1 to the third reference resistance REF3) are prepared for comparing with the combined resistance X. The first reference resistance REF1 is determined based on the combined resistance X between both ends of the sensor body 183 when the corrosion detection structure 25E whose maximum reduction amount is the largest among the three corrosion detection structures 25E to 25G is corrosively disconnected but the remaining two corrosion detection structures 25F and 25G are not disconnected. The second reference resistance REF2 is determined based on the combined resistance X between both ends of the sensor body 183 when the corrosion detection structures 25E and 25F are corrosively disconnected but the corrosion detection structure 25G whose maximum reduction amount is the smallest is not disconnected. The third reference resistance REF3 is determined based on the combined resistance X of the sensor body 183 when all of the three corrosion detection structures 25E to 25G are corrosively disconnected.

More specifically, the first reference resistance REF1 is a value obtained by multiplying the combined resistance X before corrosion (the initial combined resistance X0) by a first coefficient K1 greater than 1 (REF1=K1×X0, K1>1). The second reference resistance REF2 is a value obtained by multiplying the initial combined resistance X0 by a second coefficient K2 greater than 1 (REF2=K2×X0, K2>1). The third reference resistance REF3 is a value obtained by multiplying the initial combined resistance X0 by a third coefficient K3 greater than 1 (REF3=K3×X0, K3>1). The third coefficient K3, the second coefficient K2, and the first coefficient K1 increase in this order (K3>K2>K1). Therefore, the third reference resistance REF3, the second reference resistance REF2, and the first reference resistance REF1 increase in this order (REF3>REF2>REF1).

In the third example of the fifth embodiment, the initial combined resistance X0 was 9.01 kΩ. The first reference resistance REF1 was set to 9.02 kΩ, which is 0.1% greater than the initial combined resistance X0. The second reference resistance REF2 was set to 9.10 kΩ, which is a value 1% greater than the initial combined resistance X0. The third reference resistance REF3 was set to 10.1 kΩ, which is a value 12% greater than the initial combined resistance X0. In this case, if the combined resistance X becomes greater than the first reference resistance REF1, it means that the silver metal thin film 8 provided in the corrosion detection structure 25E was corrosively disconnected, which indicates that the danger level has reached 25%. If the combined resistance X becomes greater than the second reference resistance REF2, it means that the metal thin film 8 of the silver-zinc alloy provided in the corrosion detection structure 25F was further corrosively disconnected, which indicates that the danger level has reached 32%. If the combined resistance X becomes greater than the third reference resistance REF3, it means that the metal thin film 8 of the silver-aluminum alloy provided in the corrosion detection structure 21G was corrosively disconnected, which indicates that the danger level has reached 41%.

The flowchart of the corrosion detection procedure in the third example of the fifth embodiment is the same as the flowchart of the corrosion detection procedure in the third example of the second embodiment (see FIG. 14), and therefore, the detailed description thereof will not be repeated.

In an environment having a temperature of 75° C. and containing sublimed sulfur, an exposure test was performed on the electrical apparatus 900 (an inverter) equipped with a corrosion detection sensor including the sensor body 183 illustrated in FIG. 29. The initial combined resistance X0 was 9.01 kΩ. After 10 days from the start of the exposure test, the combined resistance X became greater than the first reference resistance REF1 (=9.02 kΩ), and the increase in resistance was confirmed to be caused by the corrosive disconnection of the corrosion detection structure 25E (a silver thin film having a film thickness of 3 µm). When the exposure test was continued thereafter, the combined resistance X became greater than the second reference resistance REF2 (=9.10 kΩ). The increase in resistance was confirmed to be caused by the corrosive disconnection of the corrosion detection structure 25F (a silver-zinc alloy thin film having a film thickness of 3 µm). When the exposure test was further continued, the combined resistance X became greater than the third reference resistance REF3 (=10.1 kΩ). The increase in resistance was confirmed to be caused by the corrosive disconnection of the corrosion detection structure 25G (a silver-aluminum alloy thin film having a film thickness of 3 µm).

Fourth Example of Fifth Embodiment

Figure 30:
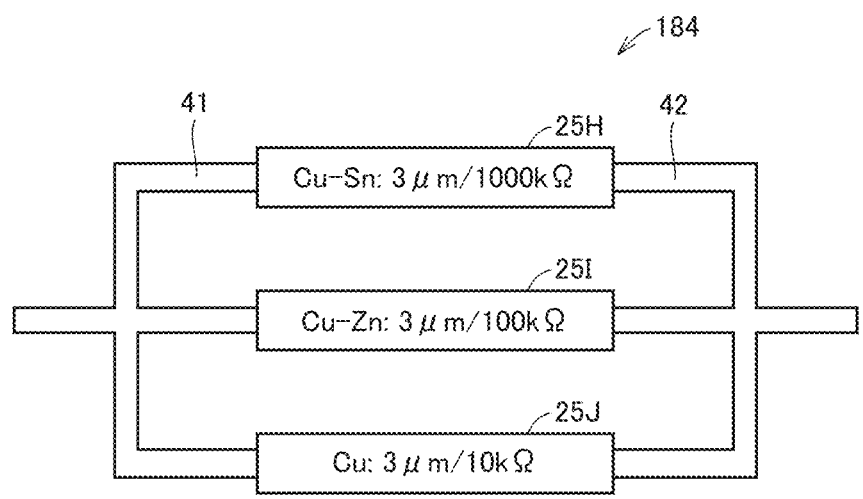
FIG. 30 is a diagram illustrating still another example configuration of a sensor body according to the fifth embodiment.

FIG. 30 is a diagram illustrating still another example configuration of a sensor body according to the fifth embodiment. FIG. 30 shows a specific configuration of corrosion detection structures provided in the sensor body according to the fourth example of the fifth embodiment. With reference to FIG. 30, the configuration of the sensor body 184 is substantially the same as the configuration of the sensor body 183 (see FIG. 29).

The film thickness of the metal thin film 8 provided in the corrosion detection structure 25H, the film thickness of the metal thin film 8 provided in the corrosion detection structure 25I, and the film thickness of the metal thin film 8 provided in the corrosion detection structure 25J were all 3 µm. The material of the metal thin film 8 provided in the corrosion detection structure 25H was a copper-tin alloy (the addition amount of tin was 6 wt %). The abovementioned film thickness of the metal thin film made of this material corresponds to a danger level of 17% (=3 µm/18 µm). The material of the metal thin film 8 provided in the corrosion detection structure 25I was a copper-zinc alloy (the addition amount of zinc was 30 wt %). The material of the metal thin film 8 provided in the corrosion detection structure 21J was copper. The resistance value of the corrosion detection structure 25H was 1000 kΩ, the resistance value of the corrosion detection structure 25I was 100 kΩ, and the resistance value of the corrosion detection structure 25J was 10 kΩ.

In an environment of 40° C./95% RH/(3 ppm $H_2S$+10 ppm $NO_2$), an exposure test was performed on the electrical apparatus 900 (an inverter) equipped with a corrosion detection sensor including the sensor body 184. The initial combined resistance X0 was 9.01 kΩ. After 10 days from the start of the exposure test, the combined resistance X became greater than the first reference resistance REF1 (=9.02 kΩ), and the increase in resistance was confirmed to be caused by the corrosive disconnection of the corrosion detection structure 25H (a copper-tin alloy thin film having a film thickness of 3 µm). When the exposure test was continued thereafter, the combined resistance X became greater than the second reference resistance REF2 (=9.10 kΩ). The increase in resistance was confirmed to be caused by the corrosive disconnection of the corrosion detection structure 25I (a copper-zinc alloy thin film having a film thickness of 3 µm). After that, the combined resistance X became greater than the third reference resistance REF3 (=10.1 kΩ). The increase in resistance was confirmed to be caused by the corrosive disconnection of the corrosion detection structure 25J (a copper thin film having a film thickness of 3 µm).

As described above, according to the fifth embodiment, the degree of progress of corrosion to the electrical apparatus caused by the corrosive gas may be determined with a simple configuration as in the second embodiment. In the fifth embodiment, a plurality of corrosion detection structures are connected in parallel, and a plurality of danger levels are set. Thus, it is possible to notify the user of the degree of progress of corrosion in a stepwise manner in more detail.

In FIGS. 27 to 30, it is described that two or three corrosion detection structures are connected in parallel, but four or more corrosion detection structures may be used as in the second embodiment. When a number of N (N is an integer of 2 or more) corrosion detection structures are used, N parallel circuits are formed. As the number of N becomes greater, the configuration of the corrosion detection sensor becomes more complicated, which makes it possible to notify the degree of progress (the danger level) of corrosion to the user in more detail.

Sixth Embodiment

In the sixth embodiment, a configuration capable of detecting corrosion caused by a plurality of types of corrosive gases as in the third embodiment will be described. Silver or a silver-based alloy is sensitive to sublimed sulfur, chlorine gas, and the like. Copper or a copper-based alloy is sensitive to hydrogen sulfide, sulfur dioxide, nitrogen dioxide, and the like. When sublimed sulfur or the like is present in an environment where the electrical apparatus is installed, the corrosion rate of silver or a silver-based alloy is faster than the corrosion rate of copper or a copper-based alloy. Therefore, the degree of progress (the danger level) of corrosion to the electrical apparatus caused by sublimed sulfur or the like may be evaluated by using a corrosion detection structure including a silver thin film or a silver-based alloy thin film. On the other hand, when hydrogen sulfide or the like is present in an environment where the electrical apparatus is installed, the corrosion rate of copper or a copper-based alloy is faster than the corrosion rate of silver or a silver-based alloy. Therefore, the danger level of corrosion to the electrical apparatus caused by hydrogen sulfide or the like may be evaluated by using a corrosion detection structure including a copper thin film or the copper-based alloy thin film.

First Example of Sixth Embodiment

Figure 31:
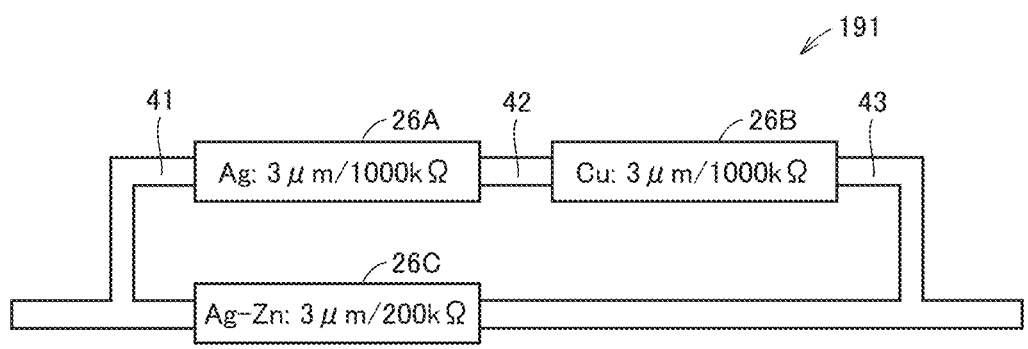
FIG. 31 is a diagram illustrating an example configuration of a sensor body according to a sixth embodiment.

FIG. 31 is a diagram illustrating an example configuration of a sensor body according to a sixth embodiment. FIG. 31 shows a specific configuration of corrosion detection structures provided in the sensor body according to a first example of the sixth embodiment.

With reference to FIG. 31, a sensor body 191 includes three corrosion detection structures 26A to 26C and three wires 41 to 43. The corrosion detection structure 26A and the corrosion detection structure 26B are connected in series by the wire 42. The corrosion detection structures 26A and 26B are connected in parallel to the corrosion detection structure 26C between the wire 41 and the wire 43. The configuration of each of the corrosion detection structures 26A to 26C is substantially the same as the configuration of the corrosion detection structure 21 illustrated in FIGS. 3 and 4.

The material of the metal thin film 8 provided in the corrosion detection structure 26A or the corrosion detection structure 26B is different from the material of the metal thin film 8 provided in the corrosion detection structure 26C. The resistance value of each of the corrosion detection structures 26A and 26B is greater than the resistance value of the corrosion detection structure 26C.

In the first example of the sixth embodiment, the material of the metal thin film 8 provided in the corrosion detection structure 26A was silver, the material of the metal thin film 8 provided in the corrosion detection structure 26B was copper, and the material of the metal thin film 8 provided in the corrosion detection structure 26C was a silver-zinc alloy (the addition amount of zinc was 0.4 wt %). The film thickness of the metal thin film 8 provided in each of the corrosion detection structures 26A to 26C was 3 μm. This film thickness corresponds to a danger level of 25% (=3 μm/12 μm) in the corrosion detection structures 26A and 26B, and corresponds to a danger level of 32% (=3 μm/9.1 μm) in the corrosion detection structure 26C. The resistance value of each of the corrosion detection structures 26A and 26B was 1000 kΩ, and the resistance value of the corrosion detection structure 26C was 200 kΩ.

Two reference resistances (the first reference resistance REF1 and the second reference resistance REF2) are prepared for comparing with the combined resistance X. The first reference resistance REF1 is determined based on the combined resistance X between both ends of the sensor body 191 when at least one of the corrosion detection structures 26A and 26B connected in series is corrosively disconnected. The second reference resistance REF2 is determined based on the combined resistance X between both ends of the sensor body 191 when the corrosion detection structure 26C is corrosively disconnected. A specific setting method using a coefficient is the same as the setting method in the first example (see FIG. 10) of the second embodiment. The corrosion detection procedure performed by using the corrosion detection sensor including the sensor body 191 is the same as the procedure represented by the flowchart illustrated in FIG. 11, and the description thereof will not be repeated.

In an environment having a temperature of 75° C. and containing sublimed sulfur, an exposure test was performed on the electrical apparatus 900 (an inverter) equipped with a corrosion detection sensor including the sensor body 191. The initial combined resistance X0 was 182 kΩ. After 10 days from the start of the exposure test, the combined resistance X became greater than the first reference resistance REF1 (=184 kΩ), and the increase in resistance was confirmed to be caused by the corrosive disconnection of the corrosion detection structure 26A (a silver thin film having a film thickness of 3 μm). When the exposure test was continued thereafter, the combined resistance X became greater than the second reference resistance REF2 (=202 kΩ). The increase in resistance was confirmed to be caused by the corrosive disconnection of the corrosion detection structure 26C (a silver-zinc alloy thin film having a film thickness of 3 μm).

Second Example of Sixth Embodiment

Figure 32:
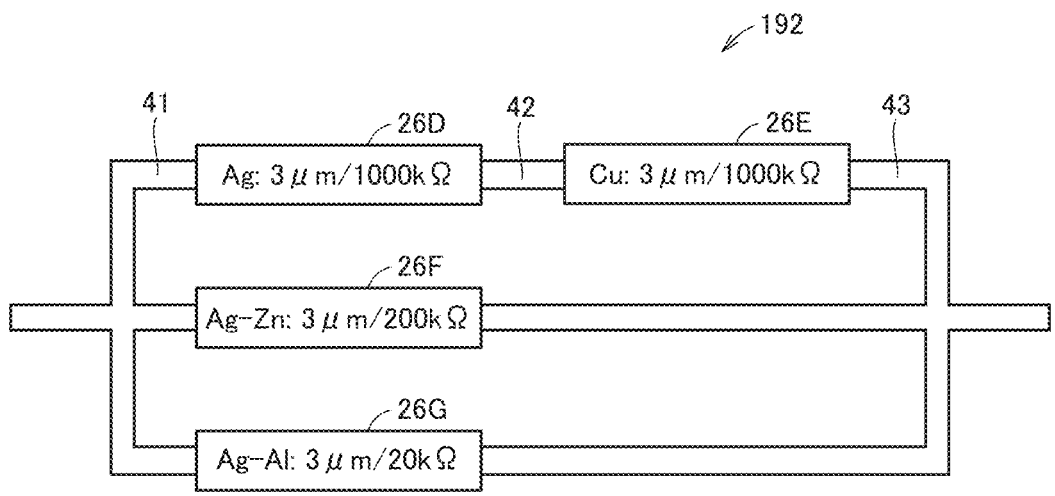
FIG. 32 is a diagram illustrating another example configuration of a sensor body according to the sixth embodiment.

FIG. 32 is a diagram illustrating another example configuration of a sensor body according to the sixth embodiment. FIG. 32 shows a specific configuration of corrosion detection structures provided in the sensor body according to a second example of the sixth embodiment.

With reference to FIG. 32, the sensor body 191 includes four corrosion detection structures 26D to 26G and three wires 41 to 43. The corrosion detection structure 26D and the corrosion detection structure 26E are connected in series by the wire 42. The corrosion detection structures 26D and 26E, the corrosion detection structure 26F, and the corrosion detection structure 26G are connected in parallel between the wire 41 and the wire 43. The configuration of each of the corrosion detection structures 26D to 26G is substantially the same as the configuration of the corrosion detection structure 21 illustrated in FIGS. 3 and 4.

The material of the metal thin film 8 provided in the corrosion detection structure 26D or the corrosion detection structure 26E, the material of the metal thin film 8 provided in the corrosion detection structure 26F, and the material of the metal thin film 8 provided in the corrosion detection structure 26G are different from each other. The resistance value of the corrosion detection structure 26D is equal to the resistance value of the corrosion detection structure 26E. The resistance value of each of the corrosion detection structures 26D and 26E is greater than the resistance value of the corrosion detection structure 26F. The resistance value of the corrosion detection structure 26F is greater than the resistance value of the corrosion detection structure 26G.

In the second example of the sixth embodiment, the material of the metal thin film 8 provided in the corrosion detection structure 26D was silver, the material of the metal thin film 8 provided in the corrosion detection structure 26E was copper, the material of the metal thin film 8 provided in the corrosion detection structure 26F was a silver-zinc alloy (the addition amount of zinc was 0.4 wt %), and the material of the metal thin film 8 provided in the corrosion detection structure 26G was a silver-aluminum alloy (the addition amount of aluminum was 0.4 wt %). The film thickness of the metal thin film 8 provided in each of the corrosion detection structures 26D to 26G was 3 μm. This film thickness corresponds to a danger level of 25% (=3 μm/12 μm) in the corrosion detection structures 26D and 26E, corresponds to a danger level of 32% (=3 μm/9.1 μm) in the corrosion detection structure 26F, and corresponds to a danger level of 41% (=3 μm/7.3 μm) in the corrosion detection structure 26G. The resistance value of each of the corrosion detection structures 26D and 26E was 1000 kΩ, the resistance value of the corrosion detection structure 26F was 200 kΩ, and the resistance value of the corrosion detection structure 26G was 20 kΩ.

Three reference resistances (the first reference resistance REF1 to the third reference resistance REF3) are prepared for comparing with the combined resistance X. The first reference resistance REF1 is determined based on the combined resistance X between both ends of the sensor body 192 when at least one of the corrosion detection structures 26D and 26E connected in series is corrosively disconnected. The second reference resistance REF2 is determined based on the combined resistance X between both ends of the sensor body 192 when the corrosion detection structure 26F is corrosively disconnected. The third reference resistance REF3 is determined based on the combined resistance X between both ends of the sensor body 192 when the corrosion detection structure 26G is corrosively disconnected. A specific setting method using a coefficient is the same as the setting method in the third example (see FIG. 13) of the second embodiment. The corrosion detection procedure performed by using a corrosion detection sensor including the sensor body 192 is the same as the procedure represented by the flowchart illustrated in FIG. 14, and the description thereof will not be repeated.

In an environment having a temperature of 75° C. and containing sublimed sulfur, an exposure test was performed on the electrical apparatus 900 (an inverter) equipped with a corrosion detection sensor including the sensor body 192. The initial combined resistance X0 was 18 kΩ. After 1.2 days from the start of the exposure test, the combined resistance X became greater than the first reference resistance REF1 (=18.1 kΩ), and the increase in resistance was confirmed to be caused by the corrosive disconnection of the corrosion detection structure 26D (a silver thin film having a film thickness of 3 μm). When the exposure test was continued thereafter, the combined resistance X became greater than the second reference resistance REF2 (=18.3 kΩ). The increase in resistance was confirmed to be caused by the corrosive disconnection of the corrosion detection structure 26F (a silver-zinc alloy thin film having a film thickness of 3 μm). After that, the combined resistance X became greater than the third reference resistance REF3 (=20.2 kΩ). The increase in resistance was confirmed to be caused by the corrosive disconnection of the corrosion detection structure 26G (a silver-aluminum alloy thin film having a film thickness of 3 μm).

As described above, according to the sixth embodiment, the degree of progress of corrosion to the electrical apparatus 900 caused by the corrosive gas may be determined with a simple configuration as in the first to fifth embodiments. In the sixth embodiment, it is possible to determine the corrosion to the electrical apparatus 900 caused by a plurality of types of corrosive gases. Further, by combining the serial connection and the parallel connection of the corrosion detection structure, it is possible to notify the user of the degree of progress (the danger level) of corrosion to the electrical apparatus 900 in detail.

Seventh Embodiment

As described in the fourth embodiment, even if the material of the metal thin film 8 is different in each corrosion detection structure, the resistor 9 may be provided outside the corrosion detection structure. The configuration of the electrical apparatus including the corrosion detection sensor according to the seventh embodiment is substantially the same as the configuration of the electrical apparatus 904 including the corrosion detection sensor according to the fourth embodiment (see FIG. 19). The configuration of the corrosion detection structure in the seventh embodiment is substantially the same as the configuration of the corrosion detection structure 24 in the fourth embodiment (see FIG. 20). However, in each example of the seventh embodiment, the metal thin film to be corroded by the corrosive gas is made of a silver-based alloy, a copper-based alloy, or the like in addition to silver and copper.

First Example of Seventh Embodiment

Figure 33:
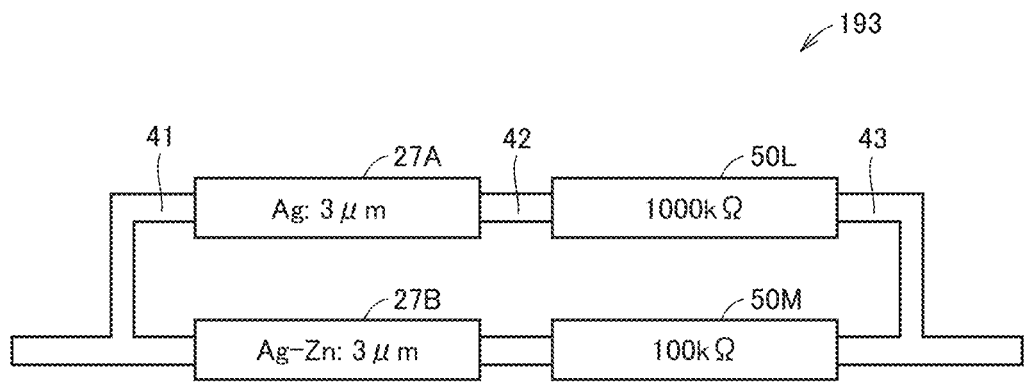
FIG. 33 is a diagram illustrating a first example configuration of a sensor body according to a seventh embodiment.

FIG. 33 is a diagram illustrating a configuration of a sensor body according to a first example of a seventh embodiment. With reference to FIG. 33, a sensor body 193 is equivalent to the sensor body 181 illustrated in FIG. 27 or the sensor body 182 illustrated in FIG. 28.

In an environment having a temperature of 75° C. and containing sublimed sulfur, an exposure test was performed on the electrical apparatus 904 (an inverter) equipped with a corrosion detection sensor including the sensor body 193. The initial combined resistance X0 was 91 kΩ. After 10 days from the start of the exposure test, the combined resistance X became greater than the first reference resistance REF1 (=92 kΩ), and the increase in resistance was confirmed to be caused by the corrosive disconnection of the corrosion detection structure 27A (a silver thin film having a film thickness of 3 μm). When the exposure test was continued thereafter, the combined resistance X became greater than the second reference resistance REF2 (=101 kΩ). The increase in resistance was confirmed to be caused by the corrosive disconnection of the corrosion detection structure 27B (a silver-zinc alloy thin film having a film thickness of 3 μm).

Second Example of Seventh Embodiment

Figure 34:
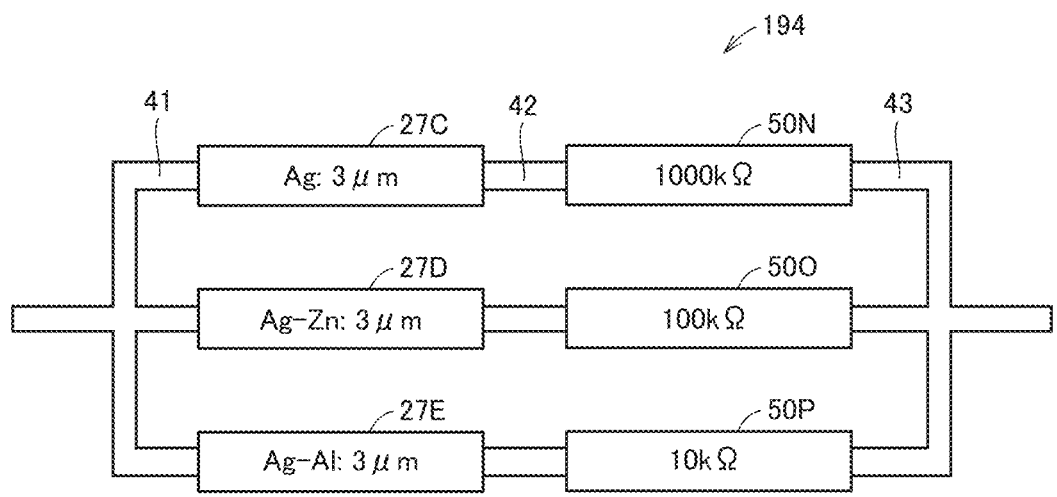
FIG. 34 is a diagram illustrating a second example configuration of a sensor body according to the seventh embodiment.

FIG. 34 is a diagram illustrating a configuration of a sensor body according to a second example of the seventh embodiment. With reference to FIG. 34, a sensor body 194 is equivalent to the sensor body 183 illustrated in FIG. 29 or the sensor body 184 illustrated in FIG. 30.

In an environment having a temperature of 75° C. and containing sublimed sulfur, an exposure test was performed on the electrical apparatus 904 (an inverter) equipped with a corrosion detection sensor including a sensor body 194. The initial combined resistance X0 was 9.01 kΩ. After 10 days from the start of the exposure test, the combined resistance X became greater than the first reference resistance REF1 (=9.02 kΩ), and the increase in resistance was confirmed to be caused by the corrosive disconnection of the corrosion detection structure 27C (a silver thin film having a film thickness of 3 μm). When the exposure test was continued thereafter, the combined resistance X became greater than the second reference resistance REF2 (=9.10 kΩ). The increase in resistance was confirmed to be caused by the corrosive disconnection of the corrosion detection structure 27D (a silver-zinc alloy thin film having a film thickness of 3 μm). After that, the combined resistance X became greater than the third reference resistance REF3 (=10.1 kΩ). The increase in resistance was confirmed to be caused by the corrosive disconnection of the corrosion detection structure 27E (a silver-aluminum alloy thin film having a film thickness of 3 μm).

Third Example of Seventh Embodiment

Figure 35:
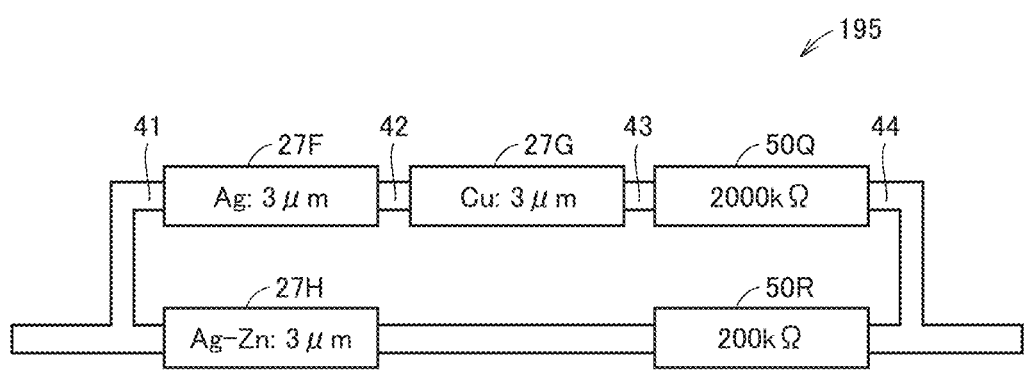
FIG. 35 is a diagram illustrating a third example configuration of a sensor body according to the seventh embodiment.

FIG. 35 is a diagram illustrating a configuration of a sensor body according to f of third example the seventh embodiment. With reference to FIG. 35, a sensor body 195 is equivalent to the sensor body 191 illustrated in FIG. 31.

In an environment having a temperature of 75° C. and containing sublimed sulfur, an exposure test was performed on the electrical apparatus 904 (an inverter) equipped with a corrosion detection sensor including a sensor body 195. The initial combined resistance X0 was 182 kΩ. After 10 days from the start of the exposure test, the combined resistance X became greater than the first reference resistance REF1 (=184 kΩ), and the increase in resistance was confirmed to be caused by the corrosive disconnection of the corrosion detection structure 27F (a silver thin film having a film thickness of 3 μm). When the exposure test was continued thereafter, the combined resistance X became greater than the second reference resistance REF2 (=202 kΩ). The increase in resistance was confirmed to be caused by the corrosive disconnection of the corrosion detection structure 27H (a silver-zinc alloy thin film having a film thickness of 3 μm).

Fourth Example of Seventh Embodiment

Figure 36:
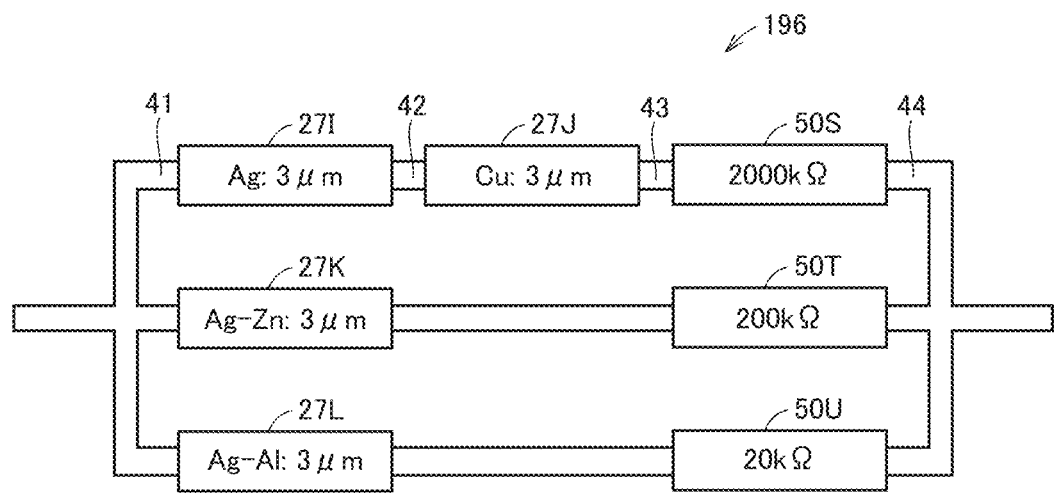
FIG. 36 is a diagram illustrating a fourth example configuration of a sensor body according to the seventh embodiment.

FIG. 36 is a diagram illustrating a configuration of a sensor body according to a fourth example of the seventh embodiment. With reference to FIG. 36, a sensor body 196 is equivalent to the sensor body 192 illustrated in FIG. 32.

In an environment having a temperature of 75° C. and containing sublimed sulfur, an exposure test was performed on the electrical apparatus 904 (an inverter) equipped with a corrosion detection sensor including a sensor body 196. The initial combined resistance X0 was 18.0 kΩ. After 10 days from the start of the exposure test, the combined resistance X became greater than the first reference resistance REF1 (=18.1 kΩ), and the increase in resistance was confirmed to be caused by the corrosive disconnection of the corrosion detection structure 27I (a silver thin film having a film thickness of 3 μm). When the exposure test was continued thereafter, the combined resistance X became greater than the second reference resistance REF2 (=18.3 kΩ). The increase in resistance was confirmed to be caused by the corrosive disconnection of the corrosion detection structure 27K (a silver-zinc alloy thin film having a film thickness of 3 μm). After that, the combined resistance X became greater than the third reference resistance REF3 (=20.2 kΩ). The increase in resistance was confirmed to be caused by the corrosive disconnection of the corrosion detection structure 27L (a silver-aluminum alloy thin film having a film thickness of 3 μm).

In each example of the seventh embodiment, it is described that the electrical apparatus 904 is exposed to an environment containing sublimed sulfur to confirm the corrosive disconnection of the metal thin film 8 made of silver or a silver-based alloy. However, as described in the fifth embodiment, it is possible to confirm the corrosive disconnection of the metal thin film 8 made of copper or a copper-based alloy in an environment of, for example, 40° C./95% RH/(3 ppm $H_2S$+10 ppm $NO_2$).

As described above, according to the seventh embodiment, even though the fixed resistor 50 (50L to 50R) is provided outside the corrosion detection structure, the degree of progress of corrosion to the electrical apparatus 904 caused by a corrosive gas may be determined with a simple configuration as in the fourth embodiment. In addition, by connecting a plurality of corrosion detection structures in series, it is possible to detect the corrosion to the electrical apparatus 904 caused by a plurality of types of corrosive gases. Further, by connecting a plurality of corrosion detection structures in parallel, it is possible to notify the user of the degree of progress (the danger level) of corrosion to the electrical apparatus 904 in more detail.

It should be understood that the embodiments disclosed herein are illustrative and not restrictive in all respects. The scope of the present invention is defined by the terms of the claims rather than the description of the embodiments above and is intended to include any modifications within the scope and meaning equivalent to the terms of the claims.

REFERENCE SIGNS LIST

3: circuit board; 4, 41, 42, 43, 44: wire; 5: solder; 6: insulating substrate; 7: electrode pair; 71: first electrode; 72: second electrode; 8: metal thin film; 9: resistor; 11, 121, 122, 131, 132, 14, 15, 16, 171 to 176, 181 to 184, 191 to 196: sensor body; 20: resistance measuring instrument; 201: voltmeter; 202: ammeter; 21, 21A to 21V, 22 to 24, 24A to 24P, 25A to 25J, 26A to 26G, 27A to 27L: corrosion detection structure; 30: control unit; 40: notification unit; 50: fixed resistor; 90: electrical apparatus body; 101, 104: corrosion detection sensor; 900, 904: electrical apparatus

The invention claimed is:

1. A corrosion detection sensor that detects corrosion to an electrical apparatus caused by a corrosive gas, the corrosion detection sensor comprising:
 a metal thin film to be corroded by the corrosive gas;
 a resistive element connected in series to the metal thin film;
 a resistance measuring unit that measures a combined resistance of the metal thin film and the resistive element; and
 a resistance output unit that outputs a detection result indicating that the combined resistance measured by the resistance measuring unit is greater than a predetermined reference resistance,
 the reference resistance being determined according to a danger level indicating that the electrical apparatus is corrosively damaged by the corrosive gas, wherein
 the danger level is a ratio of an actual reduction amount of a film thickness of the metal thin film to a maximum reduction amount of the film thickness,
 the maximum reduction amount is a reduction amount of the film thickness until the electrical apparatus is corrosively damaged when the electrical apparatus and the metal thin film are exposed to an environment containing the corrosive gas,
 the metal thin film includes a first thin film, a second thin film, a third thin film, and a fourth thin film,
 the first thin film and the second thin film are connected in series,
 the third thin film and the fourth thin film are connected in series,
 the first thin film and the second thin film are connected in parallel to the third thin film and the fourth thin film,
 each of the first thin film and the third thin film includes a material to be corroded by a first corrosive gas,
 each of the second thin film and the fourth thin film includes a material to be corroded by a second corrosive gas different from the first corrosive gas,
 the film thickness of the first thin film and the film thickness of the third thin film are different from each other,
 the film thickness of the second thin film and the film thickness of the fourth thin film are different from each other,
 a first reference resistance is defined for the first thin film and the second thin film,
 a second reference resistance is defined for the third thin film and the fourth thin film, and
 the resistance output unit outputs the detection result each time when the combined resistance measured by the resistance measuring unit becomes greater than any one of the first reference resistance and the second reference resistance.

2. The corrosion detection sensor according to claim 1 further comprising an insulating substrate, wherein
 the metal thin film and the resistive element are integrally disposed on the insulating substrate.

3. The corrosion detection sensor according to claim 1 further comprising an insulating substrate, wherein
 the metal thin film is disposed on the insulating substrate, and
 the resistive element is disposed outside the insulating substrate as a discrete component.

4. An electrical apparatus comprising:
 a corrosion detection sensor according to claim 1; and
 an electrical apparatus main body.

5. A method of detecting corrosion to an electrical apparatus caused by a corrosive gas by using a corrosion detection sensor which includes a metal thin film to be corroded by the corrosive gas and a resistive element connected in series to the metal thin film, the method comprising:

measuring a combined resistance of the metal thin film and the resistive element; and outputting a detection result indicating that the combined resistance measured in the measuring is greater than a predetermined reference resistance, the reference resistance being determined according to a danger level indicating that the electrical apparatus is corrosively damaged by the corrosive gas, wherein the danger level is a ratio of an actual reduction amount of a film thickness of the metal thin film to a maximum reduction amount of the film thickness, the maximum reduction amount is a reduction amount of the film thickness until the electrical apparatus is corrosively damaged when the electrical apparatus and the metal thin film are exposed to an environment containing the corrosive gas, the metal thin film includes a first thin film, a second thin film, a third thin film, and a fourth thin film, the first thin film and the second thin film are connected in series, the third thin film and the fourth thin film are connected in series, the first thin film and the second thin film are connected in parallel to the third thin film and the fourth thin film, each of the first thin film and the third thin film includes a material to be corroded by a first corrosive gas, each of the second thin film and the fourth thin film includes a material to be corroded by a second corrosive gas different from the first corrosive gas, the film thickness of the first thin film and the film thickness of the third thin film are different from each other, the film thickness of the second thin film and the film thickness of the fourth thin film are different from each other, a first reference resistance is defined for the first thin film and the second thin film, a second reference resistance is defined for the third thin film and the fourth thin film, and the outputting includes outputting the detection result each time when the combined resistance becomes greater than any one of the first reference resistance and the second reference resistance.

6. A corrosion detection sensor that detects corrosion to an electrical apparatus caused by a corrosive gas, the corrosion detection sensor comprising:

a metal thin film to be corroded by the corrosive gas;

a resistive element connected in series to the metal thin film;

a resistance measuring unit that measures a combined resistance of the metal thin film and the resistive element; and a resistance output unit that outputs a detection result indicating that the combined resistance measured by the resistance measuring unit is greater than a predetermined reference resistance, the reference resistance being determined according to a danger level indicating that the electrical apparatus is corrosively damaged by the corrosive gas, wherein the danger level is a ratio of an actual reduction amount of a film thickness of the metal thin film to a maximum reduction amount of the film thickness, the maximum reduction amount is a reduction amount of the film thickness until the electrical apparatus is corrosively damaged when the electrical apparatus and the metal thin film are exposed to an environment containing the corrosive gas, the metal thin film includes a first thin film, a second thin film, and a third thin film, the first thin film and the second thin film are connected in series, the first thin film and the second thin film are connected in parallel to the third thin film, the first thin film and the third thin film include different materials from each other to be corroded by a first corrosive gas, the second thin film includes a material to be corroded by a second corrosive gas different from the first corrosive gas, a first reference resistance is defined for the first thin film and the second thin film, a second reference resistance is defined for the third thin film, and the resistance output unit outputs the detection result each time when the combined resistance measured by the resistance measuring unit becomes greater than any one of the first reference resistance and the second reference resistance.

7. The corrosion detection sensor according to claim 6 further comprising an insulating substrate, wherein the metal thin film and the resistive element are integrally disposed on the insulating substrate.

8. The corrosion detection sensor according to claim 6 further comprising an insulating substrate, wherein the metal thin film is disposed on the insulating substrate, and the resistive element is disposed outside the insulating substrate as a discrete component.

9. An electrical apparatus comprising:

a corrosion detection sensor according to claim 6; and an electrical apparatus main body.

* * * * *